United States Patent
Ku et al.

(10) Patent No.: US 11,983,401 B1
(45) Date of Patent: May 14, 2024

(54) SYSTEMS AND METHODS OF INTERACTING WITH A VIRTUAL GRID IN A THREE-DIMENSIONAL (3D) SENSORY SPACE

(71) Applicant: Ultrahaptics IP Two Limited, Bristol (GB)

(72) Inventors: Bingxin Ku, San Francisco, CA (US);
Pohung Chen, Fremont, CA (US);
Isaac L. Cohen, Oakland, CA (US);
Paul A. Durdik, Foster City, CA (US)

(73) Assignee: ULTRAHAPTICS IP TWO LIMITED,, United Kingd, Bristol (GB)

( * ) Notice: Subject to any disclaimer, the term of this patent is extended or adjusted under 35 U.S.C. 154(b) by 0 days.

(21) Appl. No.: 15/832,697

(22) Filed: Dec. 5, 2017

Related U.S. Application Data

(63) Continuation of application No. 14/625,632, filed on Feb. 19, 2015, now abandoned.

(60) Provisional application No. 62/007,885, filed on Jun. 4, 2014.

(51) Int. Cl.
*G06F 3/04883* (2022.01)
*G06T 19/00* (2011.01)

(52) U.S. Cl.
CPC ........ *G06F 3/04883* (2013.01); *G06T 19/006* (2013.01)

(58) Field of Classification Search
CPC .......................... G06F 3/04883; G06T 19/006
See application file for complete search history.

(56) References Cited

U.S. PATENT DOCUMENTS 8,942,881 B2   1/2015  Hobbs et al.
2009/0076766 A1  3/2009  Fein et al.
(Continued)

FOREIGN PATENT DOCUMENTS

WO    2015048905 A1   4/2015

OTHER PUBLICATIONS

U.S. Appl. No. 61/886,443 by Balachandreswaran et al., filed Oct. 3, 2013, PDF copy downloaded as a priority document for WO 2015/048905 on Feb. 22, 2023 at: https://patentscope.wipo.int/search/en/detail.jsf?docId=WO2015048905 under Documents tab; 37 pages.

(Continued)

*Primary Examiner* — Roland J Casillas
(74) *Attorney, Agent, or Firm* — Haynes Beffel & Wolfeld, LLP; Franklin M. Schellenberg; Andrew L. Dunlap

(57) ABSTRACT

The technology disclosed relates to selecting a virtual item from a virtual grid in a three-dimensional (3D) sensory space. It also relates to navigating a virtual modality displaying a plurality of virtual items arranged in a grid by and automatically selecting a virtual item in a virtual grid at a terminal end of a control gesture of a control object responsive to a terminal gesture that transitions the control object from one physical arrangement to another. In one implementation, the control object is a hand. In some implementations, physical arrangements of the control object include at least a flat hand with thumb parallel to fingers, closed, half-open, pinched, curled, fisted, mime gun, okay sign, thumbs-up, ILY sign, one-finger point, two-finger point, thumb point, or pinkie point.

10 Claims, 22 Drawing Sheets

(56) References Cited

U.S. PATENT DOCUMENTS

| | | | |
|---|---|---|---|
| 2010/0095206 A1* | 4/2010 | Kim | G06F 3/017 |
| | | | 715/702 |
| 2010/0185529 A1 | 7/2010 | Chesnut et al. | |
| 2011/0109577 A1* | 5/2011 | Lee | G06F 3/04883 |
| | | | 345/173 |
| 2012/0113140 A1 | 5/2012 | Hilliges et al. | |
| 2012/0249741 A1* | 10/2012 | Maciocci | G06T 19/006 |
| | | | 348/51 |
| 2013/0187950 A1 | 7/2013 | Nowatzyk | |
| 2014/0104274 A1* | 4/2014 | Hilliges | G06F 30/20 |
| | | | 345/424 |
| 2014/0137029 A1* | 5/2014 | Stephenson | G06F 3/0486 |
| | | | 715/784 |
| 2014/0235324 A1* | 8/2014 | Ryan | G07F 17/3211 |
| | | | 463/21 |
| 2014/0306993 A1* | 10/2014 | Poulos | G06T 19/006 |
| | | | 345/633 |
| 2014/0364208 A1* | 12/2014 | Perry | A63F 13/31 |
| | | | 463/31 |
| 2015/0016777 A1 | 1/2015 | Abovitz et al. | |
| 2015/0052479 A1* | 2/2015 | Ooi | G06F 3/0482 |
| | | | 715/810 |
| 2016/0292923 A1* | 10/2016 | Balachandreswaran | |
| | | | H04N 7/183 |

OTHER PUBLICATIONS

U.S. Appl. No. 14/625,632, filed Feb. 19, 2019.

U.S. Appl. No. 14/625,632—Office Action dated Jan. 25, 2017, 22 pages.

U.S. Appl. No. 14/625,632—Response to Office Action dated Jan. 25, 2017 filed Apr. 25, 2017, 16 pages.

U.S. Appl. No. 14/625,632—Supplemental Response to Office Action dated Jan. 25, 2017 filed Apr. 26, 2017, 16 pages.

U.S. Appl. No. 14/625,632—Final Office Action dated Jun. 6, 2017, 26 pages.

U.S. Appl. No. 14/625,632—Response to Final Office Action dated Jun. 6, 2017, filed Sep. 6, 2017, 12 pages.

\* cited by examiner

SYSTEMS AND METHODS OF INTERACTING WITH A VIRTUAL GRID IN A THREE-DIMENSIONAL (3D) SENSORY SPACE

PRIORITY DATA

This application is a continuation of U.S. patent application Ser. No. 14/625,632, entitled "SYSTEMS AND METHODS OF INTERACTING WITH A VIRTUAL GRID IN A THREE-DIMENSIONAL (3D) SENSORY SPACE", filed 19 Feb. 2015, which claims the benefit of U.S. Provisional Patent Application No. 62/007,885, entitled, "SYSTEMS AND METHODS OF INTERACTING WITH A VIRTUAL GRID IN A THREE-DIMENSIONAL (3D) SENSORY SPACE," filed 4 Jun. 2014. The applications are hereby incorporated by reference for all purposes.

INCORPORATIONS

Materials incorporated by reference in this filing include the following:
"PREDICTIVE INFORMATION FOR FREE SPACE GESTURE CONTROL AND COMMUNICATION", U.S. Prov. App. No. 61/873,758, filed 4 Sep. 2013,
"VELOCITY FIELD INTERACTION FOR FREE SPACE GESTURE INTERFACE AND CONTROL", U.S. Prov. App. No. 61/891,880, filed 16 Oct. 2013,
"INTERACTIVE TRAINING RECOGNITION OF FREE SPACE GESTURES FOR INTERFACE AND CONTROL", U.S. Prov. App. No. 61/872,538, filed 30 Aug. 2013,
"DRIFT CANCELLATION FOR PORTABLE OBJECT DETECTION AND TRACKING", U.S. Prov. App. No. 61/938,635, filed 11 Feb. 2014,
"SAFETY FOR WEARABLE VIRTUAL REALITY DEVICES VIA OBJECT DETECTION AND TRACKING", U.S. Prov. App. No. 61/981,162, filed 17 Apr. 2014,
"WEARABLE AUGMENTED REALITY DEVICES WITH OBJECT DETECTION AND TRACKING", U.S. Prov. App. No. 62/001,044, filed 20 May 2014,
"METHODS AND SYSTEMS FOR IDENTIFYING POSITION AND SHAPE OF OBJECTS IN THREE-DIMENSIONAL SPACE", U.S. Prov. App. No. 61/587,554, filed 17 Jan. 2012,
"SYSTEMS AND METHODS FOR CAPTURING MOTION IN THREE-DIMENSIONAL SPACE", U.S. Prov. App. No. 61/724,091, filed 8 Nov. 2012,
"NON-TACTILE INTERFACE SYSTEMS AND METHODS", U.S. Prov. App. No. 61/816,487, filed 26 Apr. 2013,
"DYNAMIC USER INTERACTIONS FOR DISPLAY CONTROL", U.S. Prov. App. No. 61/752,725, filed 15 Jan. 2013,
"WEARABLE AUGMENTED REALITY DEVICES WITH OBJECT DETECTION AND TRACKING", U.S. Prov. App. No. 62/001,044, filed 20 May 2014,
"VEHICLE MOTION SENSORY CONTROL", U.S. Prov. App. No. 62/005,981, filed 30 May 2014,
"MOTION CAPTURE USING CROSS-SECTIONS OF AN OBJECT", U.S. application Ser. No. 13/414,485, filed 7 Mar. 2012, and
"SYSTEM AND METHODS FOR CAPTURING MOTION IN THREE-DIMENSIONAL SPACE", U.S. application Ser. No. 13/742,953, filed 16 Jan. 2013.

FIELD OF THE TECHNOLOGY DISCLOSED

The technology disclosed relates, in general, to augmented reality and virtual reality, and in particular implementations, to facilitating gestural interactions with a virtual object in a three-dimensional (3D) sensory space.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Augmented Reality (AR) technology refers to the real-time registration of 2D or 3D computer generated imagery onto a live view of a real-world physical space. A user is able to view and interact with the augmented imagery in such a way as to manipulate the virtual objects in their view.

However, existing human-AR systems interactions are very limited and unfeasible. Current AR systems are complex as they force the user to interact with AR environment using a keyboard and mouse, or a vocabulary of simply hand gestures. Further, despite strong academic and commercial interest in AR systems, AR systems continue to be costly and requiring expensive equipment, and thus stand unsuitable for general use by the average consumer.

An opportunity arises to provide an economical approach that provides advantages of AR for enhanced and sub-millimeter precision interaction with virtual objects without the draw backs of attaching or deploying specialized hardware.

SUMMARY

The technology disclosed relates to selecting a virtual item from a virtual grid in a three-dimensional (3D) sensory space. In particular, it relates to generating a virtual grid with a plurality of grid lines and corresponding plurality of virtual items responsive to gestures in a three-dimensional (3D) sensory space, detecting a gesture in the 3D sensory space and interpreting the gesture as selecting one of the virtual items, and automatically reporting the selection to a further computer-implemented process.

The technology disclosed also relates to navigating a virtual modality displaying a plurality of virtual items arranged in a grid. In particular, it relates to detecting a first sweep of a control object responsive to a first control gesture in a three-dimensional (3D) sensory space, defining an extent of translation along a first axis of a virtual grid in proportion to length of the first sweep of the control object, detecting a second sweep of the control object responsive to a second control gesture in the 3D sensory space, defining an extent of translation along a second axis of the virtual grid in proportion to length of the second sweep of the control object, and automatically selecting a virtual item in the virtual grid at a terminal end of the second sweep.

The technology disclosed further relates to navigating a virtual modality displaying a plurality of virtual items arranged in a grid. In particular, it relates to detecting a horizontal sweep of a control object responsive to a first control gesture in a three-dimensional (3D) sensory space, defining a horizontal extent of translation along a first axis of a virtual grid in proportion to length of the horizontal sweep of the control object, detecting a vertical sweep of the control object responsive to a second control gesture in the 3D sensory space, defining a vertical extent of translation along a second axis of the virtual grid in proportion to length of the vertical sweep of the control object, wherein the second axis is about perpendicular to the first axis, and automatically selecting a virtual item in the virtual grid at a terminal end of the vertical sweep responsive to a terminal gesture that transitions the control object from one physical arrangement to another.

In one implementation, the control object is a hand. In some implementations, physical arrangements of the control object include at least a flat hand with thumb about parallel to fingers. In some other implementations, physical arrangements of the control object include at least open, closed, and half-open. In yet other implementations, physical arrangements of the control object include at least pinched, curled, and fisted. In other implementations, physical arrangements of the control object include at least mime gun, okay sign, thumbs-up, and ILY sign. In yet other implementations, physical arrangements of the control object include at least one-finger point, two-finger point, thumb point, and pinkie point.

Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DESCRIPTION

Figure 1:
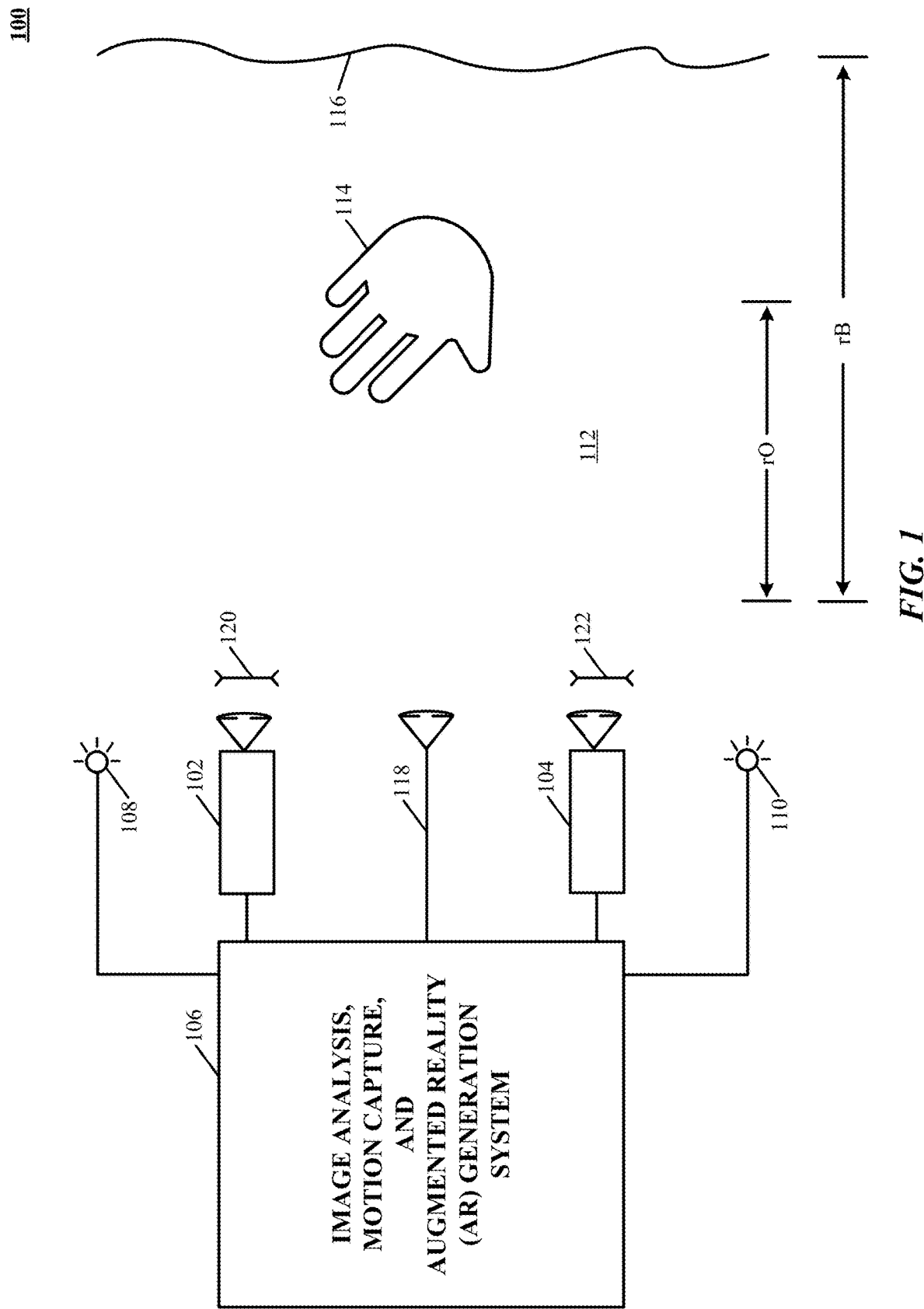
FIG. 1 illustrates an exemplary gesture-recognition system.

Implementations of the technology disclosed relate to methods and systems that facilitate gestural interactions with a virtual grid in a three-dimensional (3D) sensory space. The technology disclosed can be applied to solve the problem of how the user interacts with the augmented reality environment that is displayed. Existing AR systems restrict the user experience and prevent complete immersion into the real-world by limiting the degrees of freedom to control virtual objects. Where interaction is enabled, it is coarse, imprecise, and cumbersome and interferes with the user's natural movement. Such considerations of cost, complexity and convenience have limited the deployment and use of AR technology.

The technology disclosed allows the user to freely move around the AR environment and interact with the augmented object through free-form gestures. Examples of systems, apparatus, and methods according to the disclosed implementations are described in a "virtual slips" context. The examples of "virtual slips" are being provided solely to add context and aid in the understanding of the disclosed implementations. In other instances, examples of gesture-based AR interactions in other contexts like virtual games, virtual applications, virtual programs, virtual operating systems, etc. may be used. Other applications are possible, such that the following examples should not be taken as definitive or limiting either in scope, context, or setting. It will thus be apparent to one skilled in the art that implementations may be practiced in or outside the "virtual slips" context.

As used herein, a given signal, event or value is "responsive to" a predecessor signal, event or value of the predecessor signal, event or value influenced by the given signal, event or value. If there is an intervening processing element, step or time period, the given signal, event or value can still be "responsive to" the predecessor signal, event or value. If the intervening processing element or step combines more than one signal, event or value, the signal output of the processing element or step is considered "responsive to" each of the signal, event or value inputs. If the given signal, event or value is the same as the predecessor signal, event or value, this is merely a degenerate case in which the given signal, event or value is still considered to be "responsive to" the predecessor signal, event or value. "Responsiveness" or "dependency" or "basis" of a given signal, event or value upon another signal, event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

In this application, reference numerals not followed by a letter of the alphabet and not corresponding to at least one reference numeral in the figures refers to a collection of reference numerals followed by at least one letter of the alphabet and with the same base reference numeral. For example, a reference numeral 412 refers to the collection of reference numerals including 412 and followed by a letter in the alphabet, such as 412A, 412B, and the like.

Gesture Recognition System

The term "motion capture" refers generally to processes that capture movement of a subject in three-dimensional (3D) space and translate that movement into, for example, a digital model or other representation. Motion capture is typically used with complex subjects that have multiple separately articulating members whose spatial relationships change as the subject moves. For instance, if the subject is a walking person, not only does the whole body move across space, but the positions of arms and legs relative to the person's core or trunk are constantly shifting. Motion-capture systems are typically designed to model this articulation.

Motion capture systems can utilize one or more cameras to capture sequential images of an object in motion, and computers to analyze the images to create a reconstruction of an object's shape, position, and orientation as a function of time. For 3D motion capture, at least two cameras are typically used. Image-based motion-capture systems rely on the ability to distinguish an object of interest from a background. This is often achieved using image-analysis algorithms that detect edges, typically by comparing pixels to detect abrupt changes in color and/or brightness. Conventional systems, however, suffer performance degradation under many common circumstances, e.g., low contrast between the object of interest and the background and/or patterns in the background that may falsely register as object edges.

Referring first to FIG. 1, which illustrates an exemplary gesture recognition system 100 including any number of cameras 102, 104 coupled to an image and image analysis, motion capture, and augmented reality (AR) generation system 106 (The system 106 is hereinafter variably referred to as the "image analysis and motion capture system," the "image analysis system," the "motion capture system," the "control and image-processing system," the "control system," or the "image-processing system," "augmented reality (AR) generation system," depending on which functionality of the system is being discussed.). Cameras 102, 104 can be any type of cameras, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. While illustrated using an example of a two-camera implementation, other implementations are readily achievable using different numbers of cameras or non-camera light sensitive image sensors or combinations thereof. For example, line sensors or line cameras rather than conventional devices that capture a two-dimensional (2D) image can be employed. Further, the term "light" is used generally to connote any electromagnetic radiation, which may or may not be within the visible spectrum, and may be broadband (e.g., white light) or narrowband (e.g., a single wavelength or narrow band of wavelengths).

Cameras 102, 104 are preferably capable of capturing video images (i.e., successive image frames at a constant rate of at least 15 frames per second); although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest can be defined as a cube approximately one meter on a side.

In some implementations, the illustrated system 100 includes one or more sources 108, 110, which can be disposed to either side of cameras 102, 104, and are controlled by image analysis and motion capture system 106. In one implementation, the sources 108, 110 are light sources. For example, the light sources can be infrared light sources, e.g., infrared light emitting diodes (LEDs), and cameras 102, 104 can be sensitive to infrared light. Use of infrared light can allow the gesture recognition system 100 to operate under a broad range of lighting conditions and can avoid various inconveniences or distractions that may be associated with directing visible light into the region where the person is moving. However, a particular wavelength or region of the electromagnetic spectrum can be required. In one implementation, filters 120, 122 are placed in front of cameras 102, 104 to filter out visible light so that only infrared light is registered in the images captured by cameras 102, 104. In another implementation, the sources 108, 110 are sonic sources providing sonic energy appropriate to one or more sonic sensors (not shown in FIG. 1 for clarity sake) used in conjunction with, or instead of, cameras 102, 104. The sonic sources transmit sound waves to the user; with the user either blocking ("sonic shadowing") or altering the sound waves ("sonic deflections") that impinge upon her. Such sonic shadows and/or deflections can also be used to detect the user's gestures and/or provide presence information and/or distance information using ranging techniques. In some implementations, the sound waves are, for example, ultrasound, that are not audible to humans.

It should be stressed that the arrangement shown in FIG. 1 is representative and not limiting. For example, lasers or other light sources can be used instead of LEDs. In implementations that include laser(s), additional optics (e.g., a lens or diffuser) can be employed to widen the laser beam (and make its field of view similar to that of the cameras). Useful arrangements can also include short-angle and wide-angle illuminators for different ranges. Light sources are typically diffuse rather than specular point sources; for example, packaged LEDs with light-spreading encapsulation are suitable.

In operation, light sources 108, 110 are arranged to illuminate a region of interest 112 that includes an entire control object 114 or its portion (in this example, a hand) that may optionally hold a tool or other object of interest. Cameras 102, 104 are oriented toward the region of interest 112 to capture video images of the object (the hand) 114. In some implementations, the operation of light sources 108, 110 and cameras 102, 104 is controlled by the image analysis and motion capture system 106, which can be, e.g., a computer system, control logic implemented in hardware and/or software or combinations thereof. Based on the captured images, image analysis and motion capture system 106 determines the position and/or motion of the object (the hand) 114.

Gesture recognition can be improved by enhancing contrast between the object of interest, such as the hand 114, and background surfaces such as the surface 116 visible in an image, for example, by means of controlled lighting directed at the object. For instance, in motion capture system 106 where an object of interest 114, such as a person's hand, is significantly closer to the cameras 102 and 104 than the background surface 116, the falloff of light intensity with distance ($1/r^2$ for point-like light sources) can be exploited by positioning a light source (or multiple light sources) near the camera(s) or other image-capture device(s) and shining that light onto the object of interest 114. Source light reflected by the nearby object of interest 114 can be expected to be much brighter than light reflected from more distant background surface 116, and the more distant the background (relative to the object), the more pronounced the effect will be. Accordingly, a threshold cut off on pixel brightness in the captured images can be used to distinguish "object" pixels from "background" pixels. While broadband ambient light sources can be employed, various implementations use light having a confined wavelength range and a camera matched to detect such light; for example, an infrared source light can be used with one or more cameras sensitive to infrared frequencies.

In operation, cameras 102, 104 are oriented toward a region of interest 112 in which an object of interest 114 (in this example, a hand) and one or more background objects 116 can be present. Light sources 108, 110 are arranged to illuminate region of interest 112. In some implementations, one or more of the light sources 108, 110 and one or more of the cameras 102, 104 are disposed below the motion to be detected, e.g., in the case of hand motion, on a table or other surface beneath the spatial region where hand motion occurs. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Further, if the cameras 102, 104 are looking up, there is little likelihood of confusion with background objects (clutter on the user's desk, for example) and other people within the cameras' field of view.

Control and image-processing system 106, which can be, e.g., a computer system, can control the operation of light sources 108, 110 and cameras 102, 104 to capture images of region of interest 112. Based on the captured images, the image-processing system 106 determines the position and/or motion of the object of interest 114. For example, as a step in determining the position of the object of interest 114, image-analysis system 106 can determine which pixels of various images captured by cameras 102, 104 contain portions of the object of interest 114. In some implementations, any pixel in an image can be classified as an "object" pixel or a "background" pixel depending on whether that pixel contains a portion of the object of interest 114 or not. With the use of light sources 108, 110, classification of pixels as object or background pixels can be based on the brightness of the pixel. For example, the distance (rO) between an object of interest 114 and cameras 102, 104 is expected to be smaller than the distance (rB) between background object(s) 116 and cameras 102, 104. Because the intensity of light from sources 108, 110 decreases as $1/r^2$, the object of interest 114 will be more brightly lit than background 116, and pixels containing portions of the object of interest 114 (i.e., object pixels) will be correspondingly brighter than pixels containing portions of background 116 (i.e., background pixels). For example, if rB/rO=2, then object pixels will be approximately four times brighter than background pixels, assuming the object of interest 114 and background 116 are similarly reflective of the light from sources 108, 110, and further assuming that the overall illumination of region of interest 112 (at least within the frequency band captured by cameras 102, 104) is dominated by light sources 108, 110. These assumptions generally hold for suitable choices of cameras 102, 104, light sources 108, 110, filters 120, 122, and objects commonly encountered. For example, light sources 108, 110 can be infrared LEDs capable of strongly emitting radiation in a narrow frequency band, and filters 120, 122 can be matched to the frequency band of light sources 108, 110. Thus, although a human hand or body, or a heat source or other object in the background, may emit some infrared radiation, the response of cameras 102, 104 can still be dominated by light originating from sources 108, 110 and reflected by the object of interest 114 and/or background 116.

In this arrangement, image-analysis system 106 can quickly and accurately distinguish object pixels from background pixels by applying a brightness threshold to each pixel. For example, pixel brightness in a CMOS sensor or similar device can be measured on a scale from 0.0 (dark) to 1.0 (fully saturated), with some number of gradations in between depending on the sensor design. The brightness encoded by the camera pixels scales standardly (linearly) with the luminance of the object, typically due to the deposited charge or diode voltages. In some implementations, light sources 108, 110 are bright enough that reflected light from an object at distance rO produces a brightness level of 1.0 while an object at distance rB=2rO produces a brightness level of 0.25. Object pixels can thus be readily distinguished from background pixels based on brightness. Further, edges of the object can also be readily detected based on differences in brightness between adjacent pixels, allowing the position of the object within each image to be determined. Correlating object positions between images from cameras 102, 104 allows image-analysis system 106 to determine the location in 3D space of the object of interest 114, and analyzing sequences of images allows image-analysis system 106 to reconstruct 3D motion of the object of interest 114 using conventional motion algorithms.

In accordance with various implementations of the technology disclosed, the cameras 102, 104 (and typically also the associated image-analysis functionality of control and image-processing system 106) are operated in a low-power mode until an object of interest 114 is detected in the region of interest 112. For purposes of detecting the entrance of an object of interest 114 into this region, the system 100 further includes one or more light sensors 118 that monitor the brightness in the region of interest 112 and detect any change in brightness. For example, a single light sensor including, e.g., a photodiode that provides an output voltage indicative of (and over a large range proportional to) a measured light intensity may be disposed between the two cameras 102, 104 and oriented toward the region of interest 112. The one or more sensors 118 continuously measure one or more environmental illumination parameters such as the brightness of light received from the environment. Under static conditions—which implies the absence of any motion in the region of interest 112—the brightness will be constant. If an object enters the region of interest 112, however, the brightness may abruptly change. For example, a person walking in front of the sensor(s) 118 may block light coming from an opposing end of the room, resulting in a sudden decrease in brightness. In other situations, the person may reflect light from a light source in the room onto the sensor, resulting in a sudden increase in measured brightness.

The aperture of the sensor(s) 118 may be sized such that its (or their collective) field of view overlaps with that of the cameras 102, 104. In some implementations, the field of view of the sensor(s) 118 is substantially co-existent with that of the cameras 102, 104 such that substantially all objects entering the camera field of view are detected. In other implementations, the sensor field of view encompasses and exceeds that of the cameras. This enables the sensor(s) 118 to provide an early warning if an object of interest approaches the camera field of view. In yet other implementations, the sensor(s) capture(s) light from only a portion of the camera field of view, such as a smaller area of interest located in the center of the camera field of view.

The control and image-processing system 106 monitors the output of the sensor(s) 118, and if the measured brightness changes by a set amount (e.g., by 10% or a certain number of candela), it recognizes the presence of an object of interest in the region of interest 112. The threshold change may be set based on the geometric configuration of the region of interest and the motion-capture system, the general lighting conditions in the area, the sensor noise level, and the expected size, proximity, and reflectivity of the object of interest so as to minimize both false positives and false negatives. In some implementations, suitable settings are determined empirically, e.g., by having a person repeatedly walk into and out of the region of interest 112 and tracking the sensor output to establish a minimum change in brightness associated with the person's entrance into and exit from the region of interest 112. Of course, theoretical and empirical threshold-setting methods may also be used in conjunction. For example, a range of thresholds may be determined based on theoretical considerations (e.g., by physical modelling, which may include ray tracing, noise estimation, etc.), and the threshold thereafter fine-tuned within that range based on experimental observations.

In implementations where the region of interest 112 is illuminated, the sensor(s) 118 will generally, in the absence of an object in this area, only measure scattered light amounting to a small fraction of the illumination light. Once an object enters the illuminated area, however, this object may reflect substantial portions of the light toward the sensor(s) 118, causing an increase in the measured brightness. In some implementations, the sensor(s) 118 is (or are) used in conjunction with the light sources 108, 110 to deliberately measure changes in one or more environmental illumination parameters such as the reflectivity of the environment within the wavelength range of the light sources. The light sources may blink, and a brightness differential be measured between dark and light periods of the blinking cycle. If no object is present in the illuminated region, this yields a baseline reflectivity of the environment. Once an object is in the region of interest 112, the brightness differential will increase substantially, indicating increased reflectivity. (Typically, the signal measured during dark periods of the blinking cycle, if any, will be largely unaffected, whereas the reflection signal measured during the light period will experience a significant boost.) Accordingly, the control system 106 monitoring the output of the sensor(s) 118 may detect an object in the region of interest 112 based on a change in one or more environmental illumination parameters such as environmental reflectivity that exceeds a predetermined threshold (e.g., by 10% or some other relative or absolute amount). As with changes in brightness, the threshold change may be set theoretically based on the configuration of the image-capture system and the monitored space as well as the expected objects of interest, and/or experimentally based on observed changes in reflectivity.

Computer System

Figure 2:
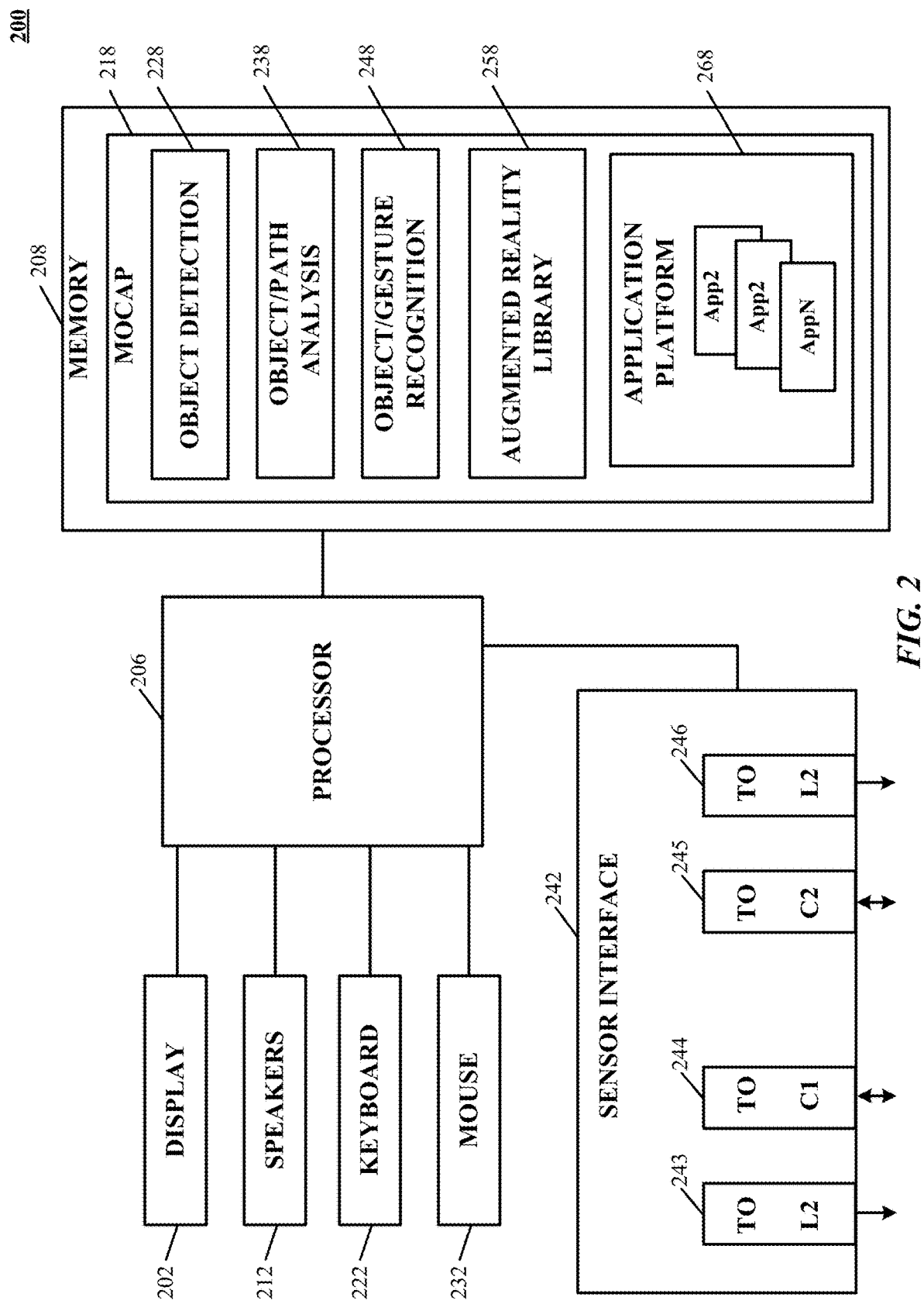
FIG. 2 is a simplified block diagram of a computer system implementing a gesture-recognition apparatus according to an implementation of the technology disclosed.

FIG. 2 is a simplified block diagram of a computer system 200, implementing image analysis and motion capture system 106 according to an implementation of the technology disclosed. Image analysis and motion capture system 106 can include or consist of any device or device component that is capable of capturing and processing image data. In some implementations, computer system 200 includes a processor 206, memory 208, a sensor interface 242, a display 202 (or other presentation mechanism(s), e.g. holographic projection systems, wearable googles or other head-mounted displays (HMDs), heads-up displays (HUDs), other visual presentation mechanisms or combinations thereof, speakers 212, a keyboard 222, and a mouse 232. Memory 208 can be used to store instructions to be executed by processor 206 as well as input and/or output data associated with execution of the instructions. In particular, memory 208 contains instructions, conceptually illustrated as a group of modules described in greater detail below, that control the operation of processor 206 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MAC OS operating system, the APACHE operating system, an OPEN-ACTION operating system, iOS, Android or other mobile operating systems, or another operating system platform.

The computing environment can also include other removable/non-removable, volatile/nonvolatile computer storage media. For example, a hard disk drive can read or write to non-removable, nonvolatile magnetic media. A magnetic disk drive can read from or write to a removable, nonvolatile magnetic disk, and an optical disk drive can read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid physical arrangement RAM, solid physical arrangement ROM, and the like. The storage media are typically connected to the system bus through a removable or non-removable memory interface.

Processor 206 can be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Sensor interface 242 can include hardware and/or software that enables communication between computer system 200 and cameras such as cameras 102, 104 shown in FIG. 1, as well as associated light sources such as light sources 108, 110 of FIG. 1. Thus, for example, sensor interface 242 can include one or more data ports 244, 245 to which cameras can be connected, as well as hardware and/or software signal processors to modify data signals received from the cameras (e.g., to reduce noise or reformat data) prior to providing the signals as inputs to a motion-capture ("mocap") program 218 executing on processor 206. In some implementations, sensor interface 242 can also transmit signals to the cameras, e.g., to activate or deactivate the cameras, to control camera settings (frame rate, image quality, sensitivity, etc.), or the like. Such signals can be transmitted, e.g., in response to control signals from processor 206, which can in turn be generated in response to user input or other detected events.

Sensor interface 242 can also include controllers 243, 246, to which light sources (e.g., light sources 108, 110) can be connected. In some implementations, controllers 243, 246 provide operating current to the light sources, e.g., in response to instructions from processor 206 executing mocap program 218. In other implementations, the light sources can draw operating current from an external power supply, and controllers 243, 246 can generate control signals for the light sources, e.g., instructing the light sources to be turned on or off or changing the brightness. In some implementations, a single controller can be used to control multiple light sources.

Instructions defining mocap program 218 are stored in memory 208, and these instructions, when executed, perform motion-capture analysis on images supplied from cameras connected to sensor interface 242. In one implementation, mocap program 218 includes various modules, such as an object detection module 228, an object analysis module 238, and a gesture-recognition module 248. Object detection module 228 can analyze images (e.g., images captured via sensor interface 242) to detect edges of an object therein and/or other information about the object's location. Object analysis module 238 can analyze the object information provided by object detection module 228 to determine the 3D position and/or motion of the object (e.g., a user's hand). Examples of operations that can be implemented in code modules of mocap program 218 are described below. Memory 208 can also include other information and/or code modules used by mocap program 218 such as augmented reality (AR) library 258 that serves as an image repository of virtual objects and an application platform 268, which allows a user to interact with the mocap program 218 using different applications like application 1 (App1), application 2 (App2), and application N (AppN).

Display 202, speakers 212, keyboard 222, and mouse 232 can be used to facilitate user interaction with computer system 200. In some implementations, results of gesture capture using sensor interface 242 and mocap program 218 can be interpreted as user input. For example, a user can perform hand gestures that are analyzed using mocap program 218, and the results of this analysis can be interpreted as an instruction to some other program executing on processor 206 (e.g., a web browser, word processor, or other application). Thus, by way of illustration, a user might use upward or downward swiping gestures to "scroll" a webpage currently displayed on display 202, to use rotating gestures to increase or decrease the volume of audio output from speakers 212, and so on.

It will be appreciated that computer system 200 is illustrative and that variations and modifications are possible. Computer systems can be implemented in a variety of form factors, including server systems, desktop systems, laptop systems, tablets, smart phones or personal digital assistants, wearable devices, e.g., goggles, head-mounted displays (HMDs), wrist computers, and so on. A particular implementation can include other functionality not described herein, e.g., wired and/or wireless network interfaces, media playing and/or recording capability, etc. In some implementations, one or more cameras can be built into the computer or other device into which the sensor is imbedded rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

While computer system 200 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

With reference to FIGS. 1 and 2, the user performs a gesture that is captured by the cameras 102, 104 as a series of temporally sequential images. In other implementations, cameras 102, 104 can capture any observable pose or portion of a user. For instance, if a user walks into the field of view near the cameras 102, 104, cameras 102, 104 can capture not only the whole body of the user, but the positions of arms and legs relative to the person's core or trunk. These are analyzed by a gesture-recognition module 248, which can be implemented as another module of the mocap program 218. Gesture-recognition module 248 provides input to an electronic device, allowing a user to remotely control the electronic device and/or manipulate virtual objects, such as prototypes/models, blocks, spheres, or other shapes, buttons, levers, or other controls, in a virtual environment displayed on display 202. The user can perform the gesture using any part of her body, such as a finger, a hand, or an arm. As part of gesture recognition or independently, the image analysis and motion capture system 106 can determine the shapes and positions of the user's hand in 3D space and in real time; see, e.g., U.S. Ser. Nos. 61/587,554, 13/414,485, 61/724,091, and 13/724,357 filed on Jan. 17, 2012, Mar. 7, 2012, Nov. 8, 2012, and Dec. 21, 2012 respectively, the entire disclosures of which are hereby incorporated by reference. As a result, the image analysis and motion capture system processor 206 can not only recognize gestures for purposes of providing input to the electronic device, but can also capture the position and shape of the user's hand in consecutive video images in order to characterize the hand gesture in 3D space and reproduce it on the display screen 202.

In one implementation, the gesture-recognition module 248 compares the detected gesture to a library of gestures electronically stored as records in a database, which is implemented in the image analysis and motion capture system 106, the electronic device, or on an external storage system. (As used herein, the term "electronically stored" includes storage in volatile or non-volatile storage, the latter including disks, Flash memory, etc., and extends to any computationally addressable storage media (including, for example, optical storage).) For example, gestures can be stored as vectors, i.e., mathematically specified spatial trajectories, and the gesture record can have a field specifying the relevant part of the user's body making the gesture; thus, similar trajectories executed by a user's hand and head can be stored in the database as different gestures so that an application can interpret them differently.

Augmented Reality

Figure 3A:
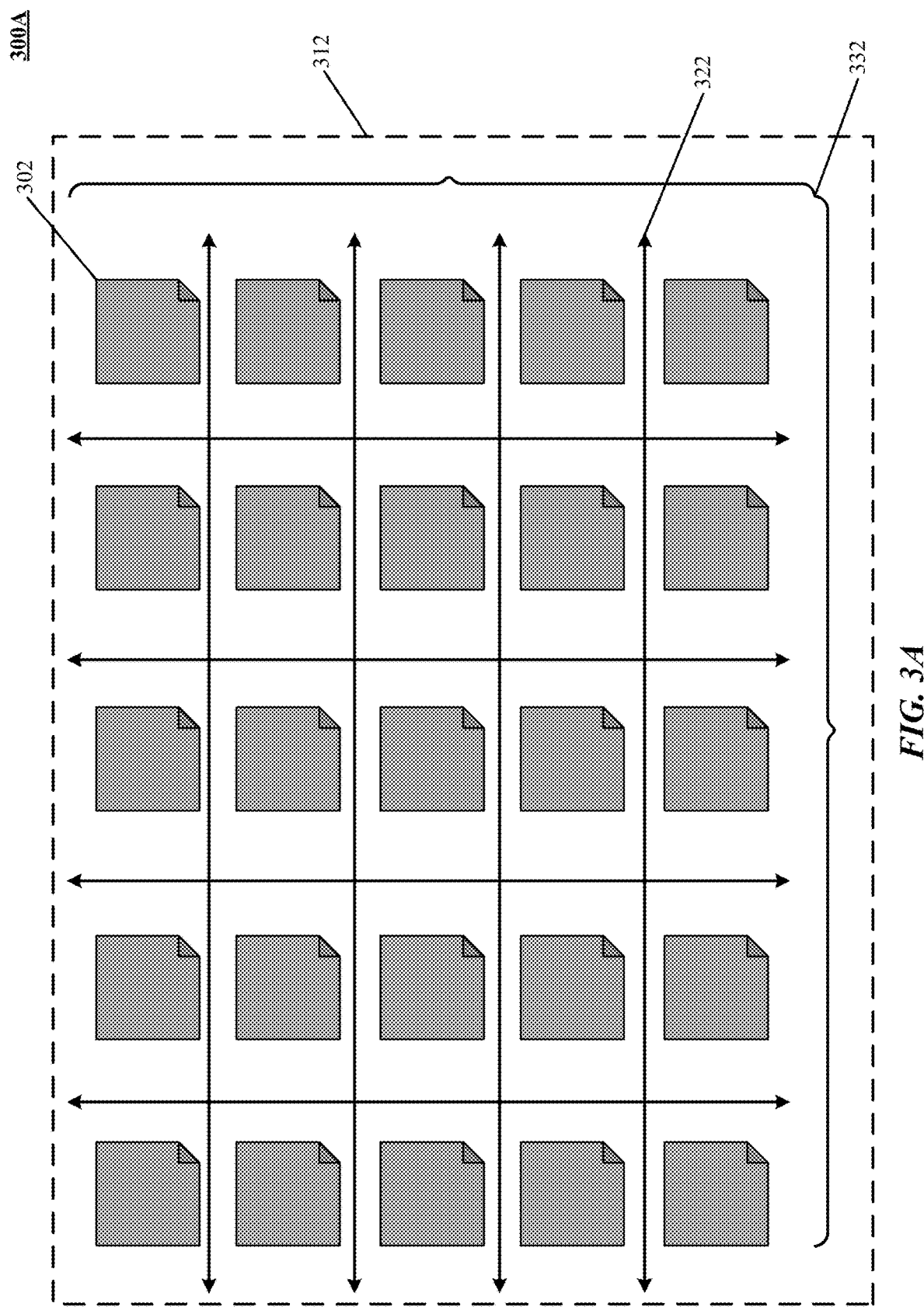
FIG. 3A shows one implementation of a virtual modality hosting a virtual gird that includes virtual slips.
Figure 3B:
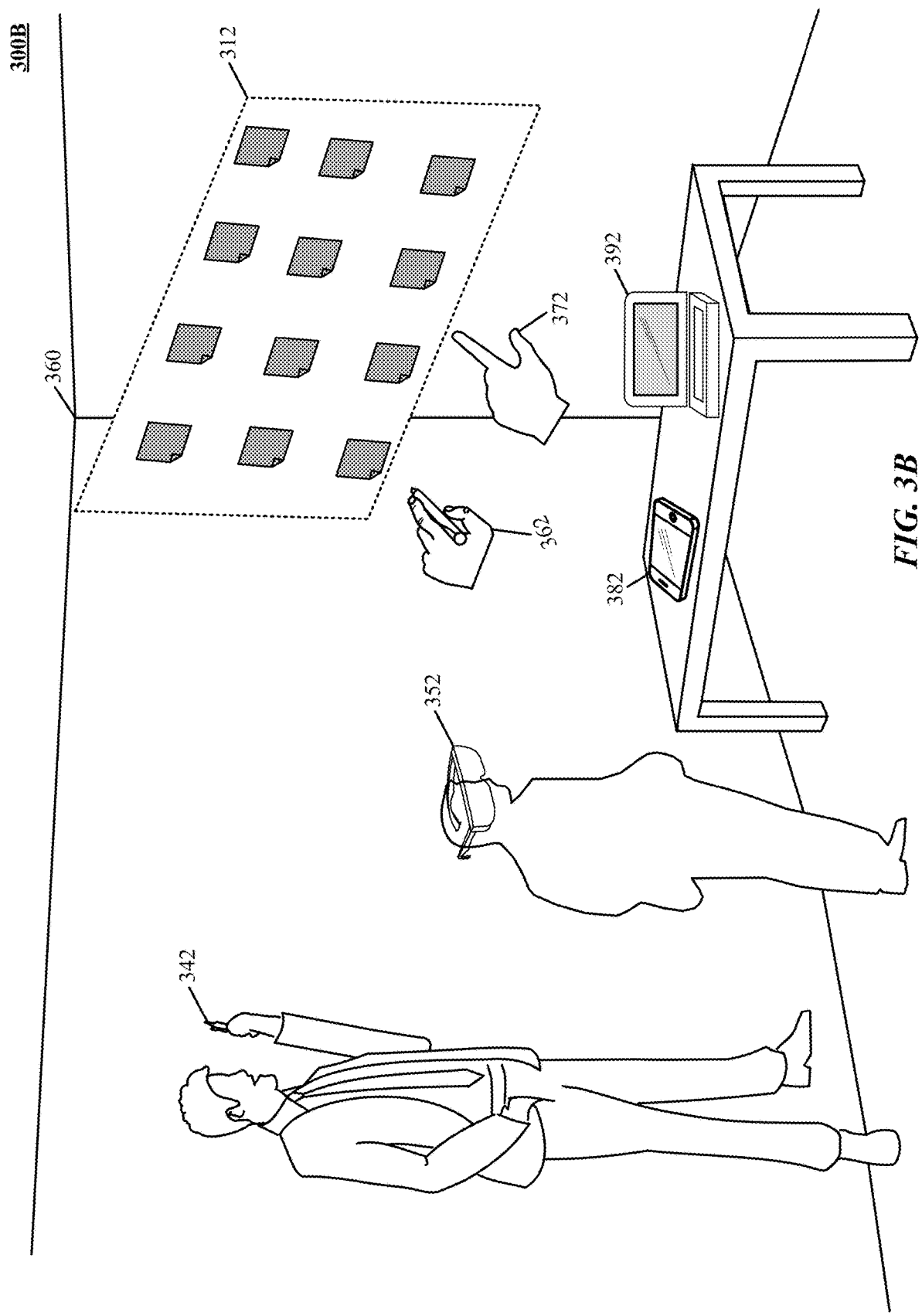
FIG. 3B illustrates one implementation of an augmented reality (AR) environment created by instantiation of a free-floating virtual modality in a real-world physical space.

Augmented reality (AR) generation system 106 includes a number of components for generating the AR environment 300B of FIG. 3B. The first component is a camera such as cameras 102 or 104 or other video input to generate a digitized video image of the real-world or user-interaction region. The camera can be any digital device that is dimensioned and configured to capture still or motion pictures of the real-world and to convert those images to a digital stream of information that can be manipulated by a computer. For example, cameras 102 or 104 can be digital still cameras, digital video cameras, web cams, head-mounted displays, phone cameras, tablet personal computers, ultra-mobile personal computers, and the like.

The second component is a transparent, partially transparent, or semi-transparent user interface such as display 202 (embedded in a user computing device like a wearable goggle 352 or a smartphone like 342 or 382) that combines rendered 3D virtual imagery with a view of the real-world, so that both are visible at the same time to a user. In some implementations, the rendered 3D virtual imagery can be projected using holographic, laser, stereoscopic, auto-stereoscopic, or volumetric 3D displays.

FIG. 3A shows an example of rendered 3D virtual imagery that is superimposed, as free-floating virtual modality 312, in the real-world physical space 360 depicted in FIG. 3B. FIG. 3A shows one implementation of virtual modality 312; hosting a virtual gird 332 that includes virtual slips 302 stratified by virtual gridlines 322. In some implementations, the virtual modality 312 can be created on the fly or can be retrieved from a repository.

FIG. 3B illustrates one implementation of an augmented reality (AR) environment 300B created by instantiation of a free-floating virtual modality 312 in a real-world physical space 360. In one implementation, computer-generated imagery, presented as free-floating virtual modality 312, can be rendered in front of a user as reflections using real-time rendering techniques such as orthographic or perspective projection, clipping, screen mapping, rasterizing and transformed into the field of view or current view space 360 of a live camera embedded in a video projector, holographic projection system, smartphone 342 or 382, wearable goggle 352 or other head-mounted display (HMD), or heads-up display (HUD). In some other implementations, transforming models into the current view space 360 can be accomplished using sensor output from onboard sensors. For example, gyroscopes, magnetometers and other motion sensors can provide angular displacements, angular rates and magnetic readings with respect to a reference coordinate frame, and that data can be used by a real-time onboard rendering engine to generate 3D imagery of virtual grid 332. If the user physically moves a user computing device 342, 352, or 382, resulting in a change of view of the embedded camera, the virtual modality 312 and computer-generated imagery can be updated accordingly using the sensor data.

In some implementations, virtual modality 312 can include a variety of information from a variety of local or network information sources. Some examples of information include specifications, directions, recipes, data sheets, images, video clips, audio files, schemas, user interface elements, thumbnails, text, references or links, telephone numbers, blog or journal entries, notes, part numbers, dictionary definitions, catalog data, serial numbers, order forms, marketing or advertising, icons associated with objects managed by an OS, and any other information that may be useful to a user. Some examples of information resources include local databases or cache memory, network databases, websites, online technical libraries, other devices, or any other information resource that can be accessed by user computing devices 342, 352, or 382 either locally or remotely through a communication link.

Virtual items can include text, images, or references to other information (e.g., links). In one implementation, interactive virtual items can be displayed proximate to their corresponding real-world objects. In another implementation, interactive virtual items can describe or otherwise provide useful information about the objects to a user. In the example shown, virtual grid 332 includes a collection of virtual slips 302 that represent real-world sticky or post-it notes. Additional related information, such as the manufacturer and part number can be included in the balloon callouts.

Some other implementations include the interactive virtual items representing other and/or different real-world products such as furniture (chairs, couches, tables, etc.), kitchen appliances (stoves, refrigerators, dishwashers, etc.), office appliances (copy machines, fax machines, computers), consumer and business electronic devices (telephones, scanners, etc.), furnishings (pictures, wall hangings, sculpture, knick-knacks, plants), fixtures (chandeliers and the like), cabinetry, shelving, floor coverings (tile, wood, carpets, rugs), wall coverings, paint colors, surface textures, countertops (laminate, granite, synthetic countertops), electrical and telecommunication jacks, audio-visual equipment, speakers, hardware (hinges, locks, door pulls, door knobs, etc.), exterior siding, decking, windows, shutters, shingles, banisters, newels, hand rails, stair steps, landscaping plants (trees, shrubs, etc.), and the like, and qualities of all of these (e.g. color, texture, finish, etc.).

Virtual modality 312 can generate for display virtual grid 332 automatically or in response to trigger events. For example, the virtual grid 332 may only appear in virtual modality 312 when the user selects an icon or invokes an application presented across the user computing devices 342, 352, or 382 and/or virtual modality 312. In other implementations, virtual modality 312 can be generated using a series of unique real-world markers. The markers can be of any design, including a circular, linear, matrix, variable bit length matrix, multi-level matrix, black/white (binary), gray scale patterns, and combinations thereof. The markers can be two-dimensional or three-dimensional. The markers can be two- or three-dimensional barcodes, or two- or three-dimensional renderings of real-world, three-dimensional objects. For example, the markers can be thumbnail images of the virtual images that are matched to the markers. The marker can also be an image of a real-world item which the software has been programmed to recognize. So, for example, the software can be programmed to recognize a sticky note or other item from a video stream of a book. The software then superimposes an interactive virtual item in place of the real-world sticky note. Each unique real-world marker corresponds to an interactive virtual item, or a quality of an interactive virtual item (e.g. the object's color, texture, opacity, adhesiveness, etc.) or both the interactive virtual item 302 itself and all (or a subset) of the qualities of the interactive virtual item.

The AR generation system 106 further uses an AR library 258 that serves as an image repository or database of interactive virtual items, a computer 200 that can selectively search and access the library 258, and a display 202 (embedded within a smartphone 342 or 382 or a virtual reality headset 352) or a projector, which are dimensioned and configured to display the real-world digital image captured by the camera, as well as interactive virtual items retrieved from the AR library 258. In some implementations, computer 200 includes a search and return engine that links each unique real-world marker to a corresponding interactive virtual item in the AR library 258.

In operation, the camera returns a digital video stream of the real-world, including images of one or more of the markers described previously. Image samples are taken from the video stream and passed to the computer 200 for processing. The search and return engine then searches the AR library 258 for the interactive virtual items that correspond to the marker images contained in the digital video stream of the real-world. Once a match is made between a real-world marker contained in the digital video stream and the AR library 258, the AR library 258 returns one or more interactive virtual items, their qualities, and their orientation to the display 202 of one of the user computing devices 342, 352, 382, or 392. The interactive virtual items are then superimposed upon the real-world image. The interactive virtual item is placed into the real-world image registration with its corresponding marker. In other implementations, multiple markers can be used to position and orient a single interactive virtual item. For example, twenty-five unique markers could be used to construct the virtual grid 332, which includes twenty-five virtual slips 302. In yet other implementations, a "markerless" AR experience can be generated by identifying features of the surrounding real-world physical environment via sensors such as gyroscopes, accelerometers, compasses, and GPS data such as coordinates.

Projected AR allows users to simultaneously view the real-world physical space 360 and the interactive virtual items (e.g. virtual modality 312, virtual grid 332, or virtual slips 302) superimposed in the space 360. In one implementation, these interactive virtual items can be projected on to the real-world physical space 360 using micro-projectors embedded in wearable goggle 352 or other head-mounted display (HMD) that cast a perspective view of a stereoscopic 3D imagery onto the real-world physical space 360. In such an implementation, a camera, in-between the micro-projectors can scan for infrared identification markers placed in the real-world physical space 360. The camera can use these markers to precisely track the user's head position and orientation in the real-world physical space 360, according to another implementation. Yet another implementation includes using retro-reflectors in the real-world physical space 360 to prevent scattering of light emitted by the micro-projectors and to provision multi-user participation by maintaining distinct and private user views. In such an implementation, multiple users can simultaneously interact with the same virtual modality, such that they both view the same virtual objects and manipulations to virtual objects by one user are seen by the other user.

In other implementations, projected AR obviates the need of using wearable hardware such as goggles and other hardware like displays to create an AR experience. In such implementations, a video projector, volumetric display device, holographic projector, and/or heads-up display can be used to create a "glasses-free" AR environment. See e.g., holographic chip projectors available from Ostendo, a company headquartered in Carlsbad, California (online.wsj.com/articles/new-chip-to-bring-holograms-to-smartphones-1401752938). In one implementation, such projectors can be electronically coupled to user computing devices such as smartphones 342 or 382 or laptop 392 and configured to produce and magnify virtual items (e.g. virtual modality 312, virtual grid 332, or virtual slips 302) that are perceived as being overlaid on the real-world physical space 360.

The third component is a control and image-processing system 106, which captures a series of sequentially temporal images of a region of interest. It further identifies any gestures performed in the region of interest and controls responsiveness of the rendered 3D virtual imagery to the performed gestures by updating the 3D virtual imagery based on the corresponding gestures.

Gestural Interactions

As discussed above, one or more user-interface components in user computing devices 342, 352, or 382 can be used to present virtual grid 332 to a user via a visual display (e.g., a thin-film-transistor display, liquid crystal display, or organic light-emitting-diode display) and/or an audio speaker. In one implementation, user-interface components can receive information from the user through a touchscreen, buttons, scroll component (e.g., a movable or virtual ring component), microphone, and/or camera (e.g., to detect gestures).

As shown in FIG. 3B, a user can interact with a virtual modality 312 by performing a gesture with a hand 372 and/or and other body movements. In one implementation, pure gestures, or gestures in combination with voice recognition, and/or a virtual or real keyboard in combination with the gestures can be used to select a virtual slip in virtual grid 332. In another implementation, a control console that recognizes gestures can be used to control the virtual modality 312. In yet another implementation, a user can use a pure gesture with the hand 372 or a combination 362 of a gesture and a held tool or other object to navigate (e.g., tilting, zooming, panning, moving) the 3D imagery hosted by the virtual modality 312.

In some implementations, a user can raise an arm, utter a verbal command, perform an optical command, or make different poses using hands and fingers (e.g., 'one finger point', 'one finger click', 'two finger point', 'two finger click', 'prone one finger point', 'prone one finger click', 'prone two finger point', 'prone two finger click', 'medial one finger point', 'medial two finger point') to select a particular virtual slip in virtual grid 332. In other implementations, a point and grasp gesture can be used to move a cursor on virtual modality 312, verbal commands can be used to select a function, application, or program, eye movements can be used to move a cursor, and blinking can indicate a selection.

These gestures allow a user to manipulate the computer-generated virtual objects superimposed in the real-world space 360. In one implementation, the user can move his or her hand 372 underneath a virtual object (e.g. virtual slip 302) to scoop it up in the palm of their hand and move the virtual object (e.g. virtual slip 302) from one location to another. In another implementation, the user can use a tool to enhance the graphics of the virtual object (e.g. virtual slip 302). In yet another implementation, manipulations can be based on physical-simulated virtual forces (e.g., virtual gravity, virtual electromagnetism, virtual impulses, virtual friction, virtual charisma, virtual stacking (placing virtual objects inside one another), etc.) enabling interactions with virtual objects over distances. For example, a "gravity grab" interaction in an astronomy genre gaming engine or physics teaching implementations includes emulating the force of gravity by selecting a function in which the strength is proportional to a "virtual mass" of the virtual object but declines with the square of the distance between the hand and the virtual object. In implementations employing strength to emulate virtual properties of objects, virtual flexibility/rigidity enable interactions with virtual objects emulating one type of material to have different interactions than virtual objects emulating another type of material. For example, a virtual steel sphere can behave differently to a "squeeze" gesture than a virtual rubber sphere. Virtual properties (e.g., virtual mass, virtual distance, virtual flexibility/rigidity, etc.) and virtual forces (e.g., virtual gravity, virtual electromagnetism, virtual charisma, etc.), like virtual objects, can be created (i.e., having no analog in the physical world) or modeled (i.e., having an analog in the physical world). Normal vectors or gradients can be used in some other implementations. In yet other implementations, the virtual objects can be rendered around the user's hand such that the computer-generated imagery moves in conjunction with and synchronously with the performance of the gestures.

Figure 4A:
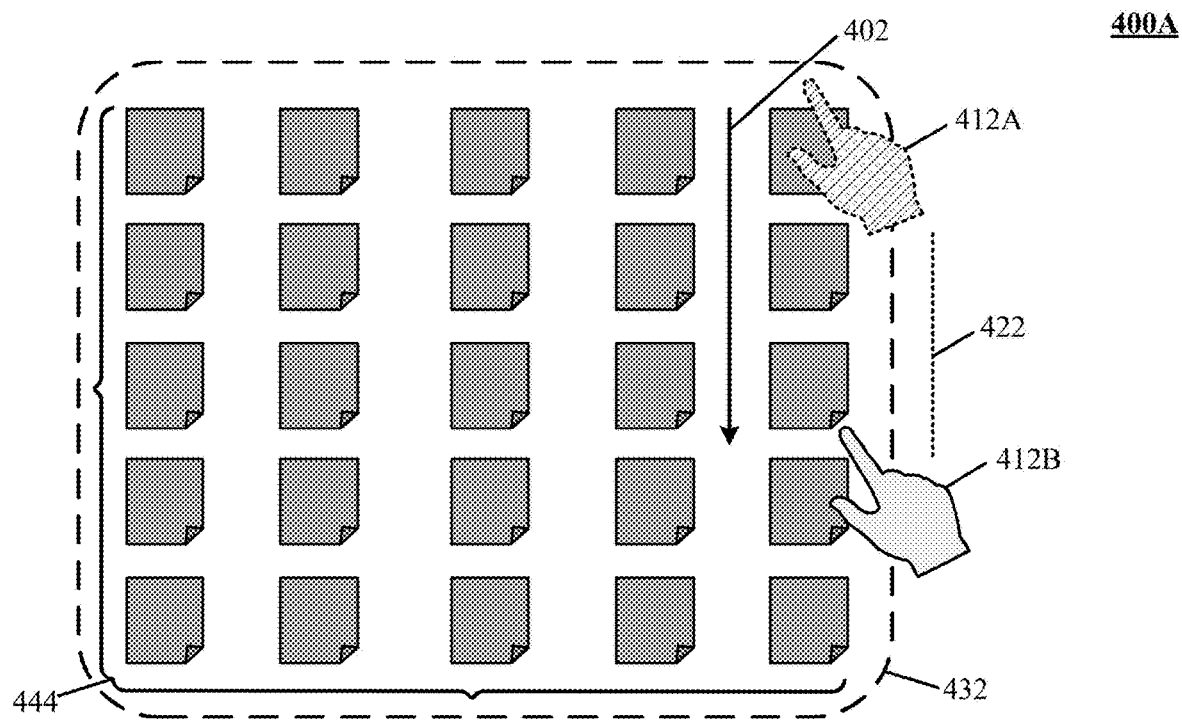
FIG. 4A is one implementation of navigating a virtual modality using a vertical sweep.

FIG. 4A is one implementation of navigating 400A a virtual modality 432 using a vertical sweep 422. Virtual modality 432 includes a collection of virtual slips arranged as a virtual grid 444 that are rendered to a user as free-floating computer-generated imagery in the user's field of view. In another implementation, a vertical sweep 422 of a control object 412 is detected responsive to a first control gesture 412A-412B in a three-dimensional (3D) sensory space. As shown in FIG. 4A, the vertical sweep 422 starts when the hand 412A is at the top right corner of the virtual modality 432 and is followed by a downward sweep that results in the hand 412B being at the bottom right corner of the virtual modality 432. This defines a vertical extent of translation 402 along a first axis of a virtual grid 444 in proportion to length of the vertical sweep 422 of the control object 412. In other implementations, the vertical sweep is an upward sweep. AR generation system 106 uses the defined vertical extent of translation 402 to accordingly alter the on-screen responsiveness of the virtual grid 444 and/or its contents corresponding to motion of the hand 412.

Figure 4B:
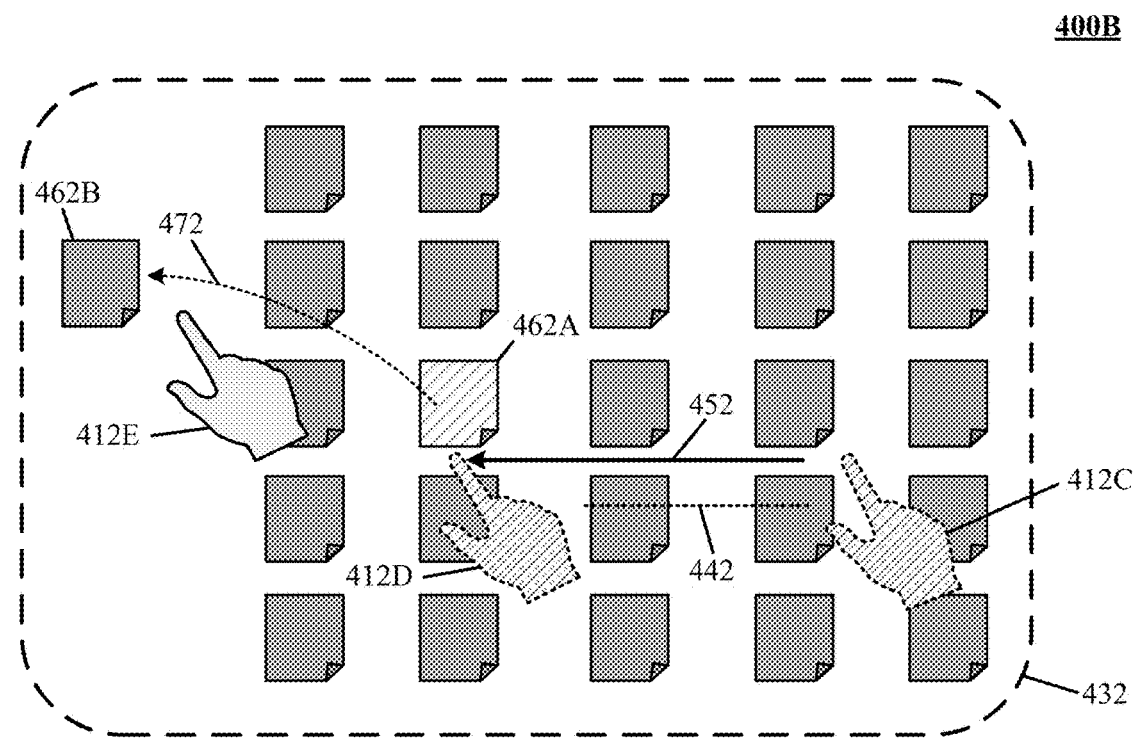
FIG. 4B illustrates one implementation of navigating a virtual modality using a horizontal sweep and selecting a virtual object in the virtual modality.

FIG. 4B illustrates one implementation of navigating the virtual modality 432 using a horizontal sweep 442 and selecting 400B a virtual object (e.g. virtual slip 462) in the virtual modality 432. In another implementation, a horizontal sweep 442 of the control object 412 is detected responsive to a second control gesture 412C-412D in the 3D sensory space. As illustrated in FIG. 4B, the horizontal sweep 442 starts when the hand 412C is at the right corner of the virtual modality 432 and is followed by a leftward sweep that results in the hand 412D being at the left corner of the virtual modality 432. This defines a horizontal extent of translation 452 along a second axis of a virtual grid 444 in proportion to length of the vertical sweep 422 of the control object 412, such that the second axis is perpendicular to the first axis. In other implementations, the horizontal sweep is a rightward sweep. AR generation system 106 uses the defined horizontal extent of translation 452 to accordingly alter the on-screen responsiveness of the virtual grid 444 and/or its contents corresponding to motion of the hand 412.

Further, a virtual item (e.g. virtual slip 462) in the virtual grid 444 is automatically selected at a terminal end or terminal gesture 412E of the horizontal sweep. In one implementation, terminal gesture 412E is a flick of a whole hand, flick of one of individual fingers or thumb of a hand, or flick of a set of bunched fingers or bunched fingers and thumb of a hand. In some implementations, selection of the virtual item (e.g. virtual slip 462) can be indicated by modifying a presentation property of the virtual item (e.g. virtual slip 462), including changing at least one of position, orientation, color, size, shape, texture, and transparency of at least a portion of the virtual item (e.g. virtual slip 462). As depicted in FIG. 4B, AR generation system 106 updates graphics of the virtual slip 462A upon selection and further removes the virtual slip 462 from one virtual location 462A and posts it to another virtual location 462B (as illustrated by transition 472).

Figure 5A:
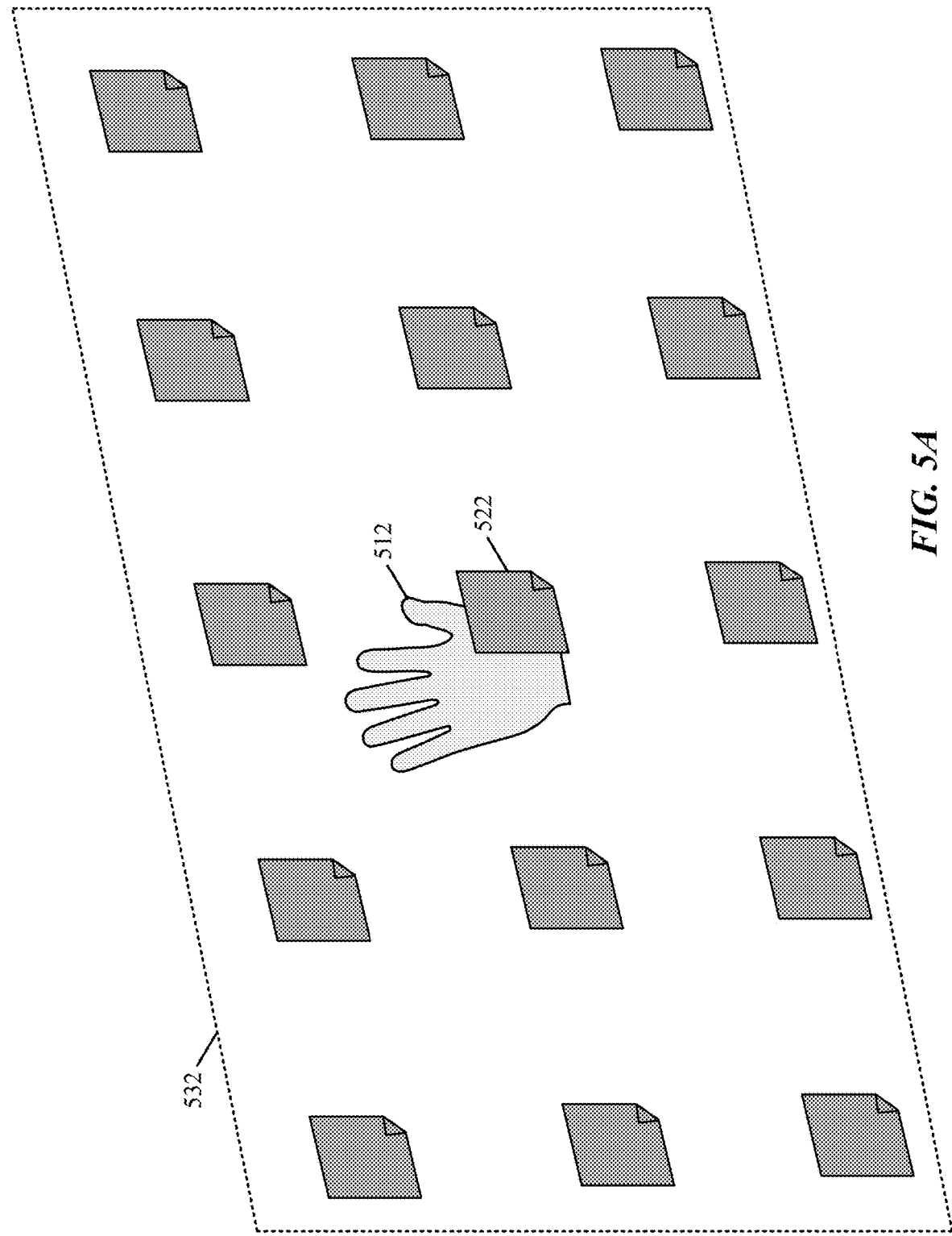
FIG. 5A shows one implementation of identifying, for selection, a particular virtual object in a virtual modality by placing hand behind or underneath the particular virtual object.

FIG. 5A shows one implementation of identifying 500A, for selection, a particular virtual object (e.g. virtual slip or note 522) in a virtual modality 532 by placing a hand 512 behind or underneath the particular virtual object (e.g. virtual slip 522). As illustrated in FIG. 5A, a particular virtual note 522 is identified for selection responsive to positioning a hand 512 behind or underneath the particular virtual note 522.

Figure 5B:
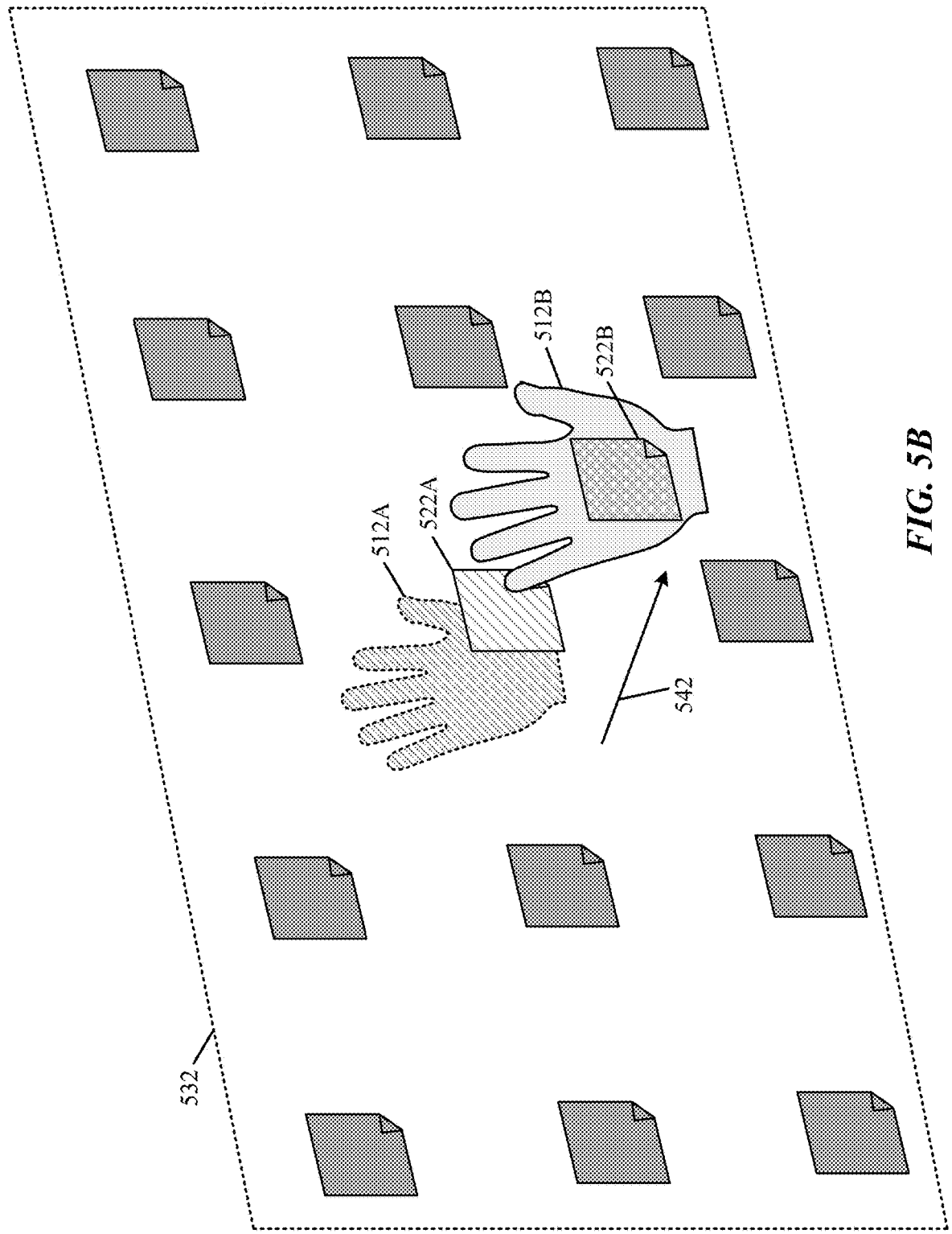
FIG. 5B illustrates one implementation of selecting a particular virtual object in a virtual modality using a scooping gesture.

FIG. 5B illustrates one implementation of selecting 500B the particular virtual object (e.g. virtual slip 522) in a virtual modality 532 using a scooping gesture 542. As shown in FIG. 5B, the particular virtual note (e.g. virtual slip 522) is selected responsive to a transition of physical arrangement of the hand 512 from a resting position 512A behind the particular virtual note (e.g. virtual slip 522) to an inward scoop 512B towards the particular virtual note (e.g. virtual slip 522). In yet other implementations, a selected virtual note (e.g. virtual slip 522) is deselected responsive to an outward scoop hand gesture.

In some implementations, selection of the virtual item (e.g. virtual slip 522) can be indicated by modifying a presentation property of the virtual item (e.g. virtual slip 522), including changing at least one of position, orientation, color, size, shape, texture, and transparency of at least a portion of the virtual item (e.g. virtual slip 522). As depicted in FIG. 5B, AR generation system 106 updates graphics of the virtual slip 522A upon selection and further brings the virtual slip 522A in forefront 522B. In other implementations, the AR generation system 106 creates different depth layers in different portions of the virtual modality 532 and maintains the transition between depth layers (e.g. when the user grasps the virtual slip 522A or places it his or her palm and raises the virtual slip 522A), thus simulating on-screen responsiveness of the virtual objects (e.g. virtual slip 522) similar to the real-world objects.

Figure 6:
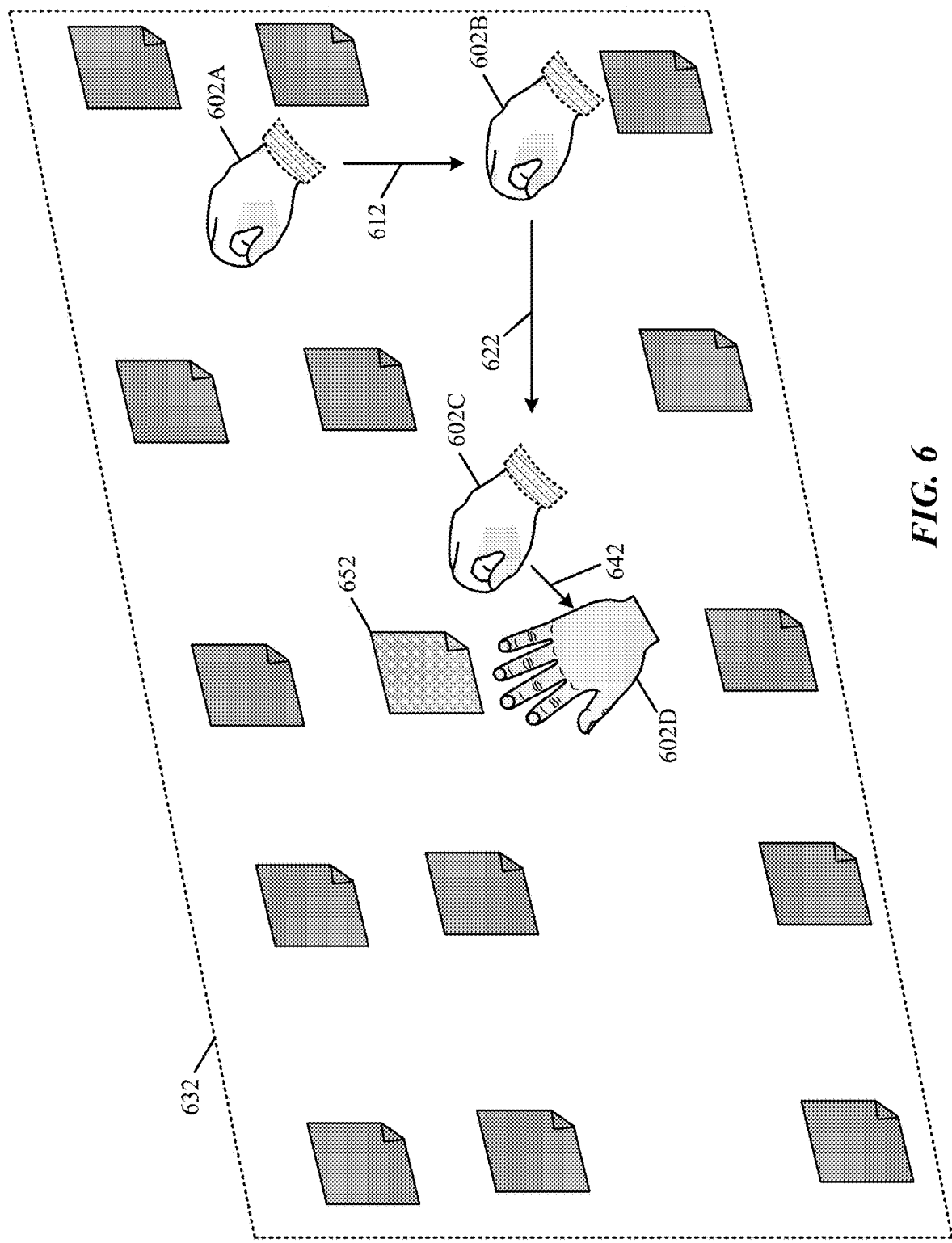
FIG. 6 illustrates one implementation of selecting a particular virtual object in response to a transition of physical arrangement of a hand from clenched fist to open hand.

FIG. 6 illustrates one implementation of selecting 600 a particular virtual object (e.g. virtual slip 652) in a virtual modality 632 in response to a transition of physical arrangement of a hand 602 from clenched first 602A-602C to open hand 602D. As illustrated in FIG. 6, a vertical extent of navigation 612 is defined along a first axis in proportion to length of a vertical sweep of the hand 602 in the 3D sensory space. Also, a horizontal extent of navigation 622 is defined along a second axis in proportion to length of a horizontal sweep of the hand 602 in the 3D sensory space, such that the second axis is perpendicular to the first axis. Further, a virtual item (e.g. virtual slip 652) is automatically selected at a terminal end of the horizontal sweep responsive to a transition of physical arrangement 642 of the hand 602 from clenched first 602C to open hand 602D.

In some implementations, selection of the virtual item (e.g. virtual slip 652) can be indicated by modifying a presentation property of the virtual item (e.g. virtual slip 652), including changing at least one of position, orientation, color, size, shape, texture, and transparency of at least a portion of the virtual item (e.g. virtual slip 652). As depicted in FIG. 6, AR generation system 106 updates graphics of the virtual slip 652 upon selection.

Figure 7:
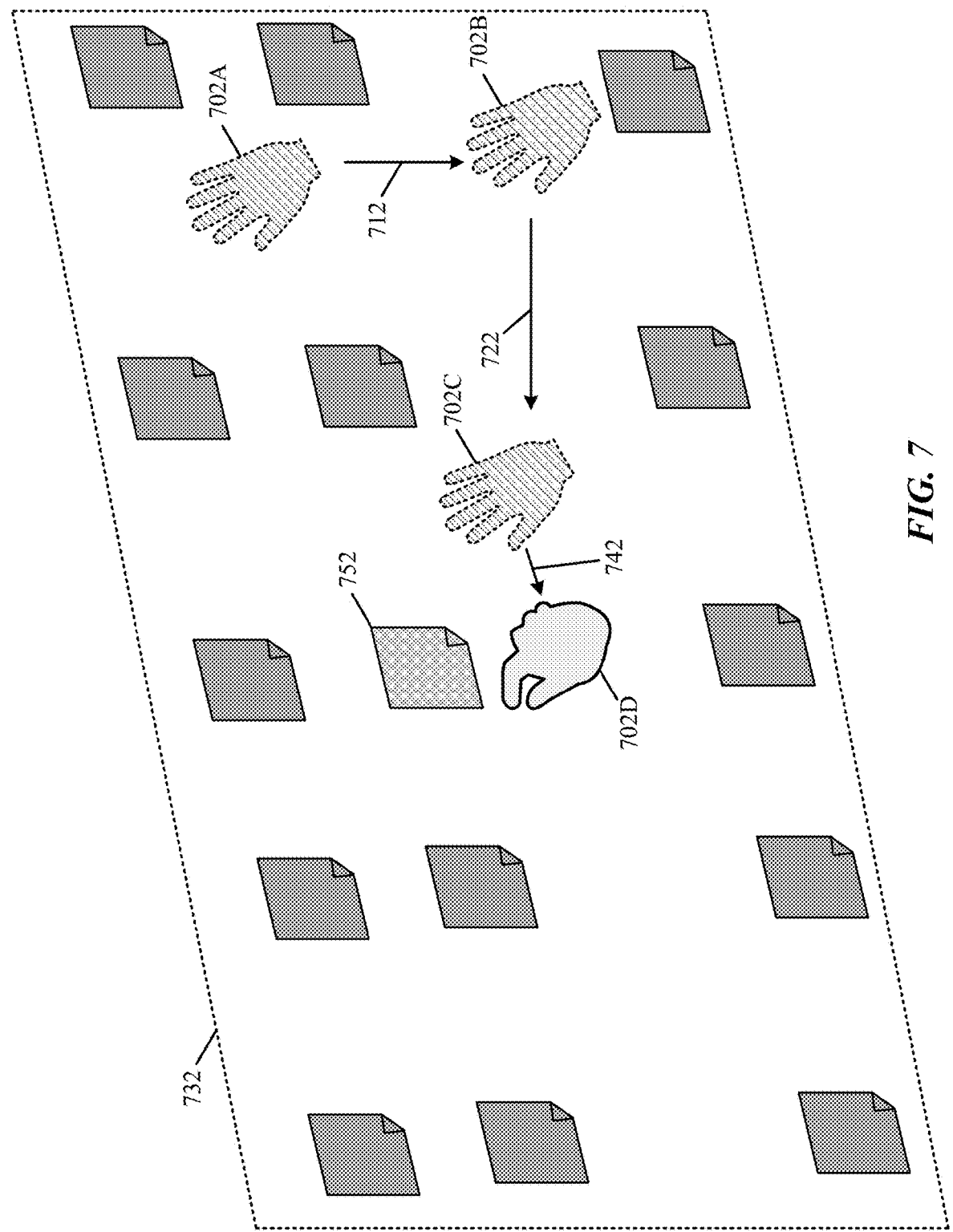
FIG. 7 is one implementation of selecting a particular virtual object in response to a transition of physical arrangement of a hand from flat-hand hovering gesture to pinching gesture.

FIG. 7 is one implementation of selecting 700 a particular virtual object (e.g. virtual slip 752) in a virtual modality 732 responsive to a transition of physical arrangement of a hand 702 from flat-hand hovering gesture 702A-702C to pinching gesture 702D. As shown in FIG. 7, a particular virtual note (e.g. virtual slip 752) is identified for selection responsive to flat-hand hovering 702A-702C of the hand 702 above the particular virtual note (e.g. virtual slip 752). A vertical extent of navigation 712 is defined along a first axis in proportion to length of a vertical sweep of the hand 702 in the 3D sensory space. Also, a horizontal extent of navigation 722 is defined along a second axis in proportion to length of a horizontal sweep of the hand 702 in the 3D sensory space, such that the second axis is perpendicular to the first axis. Further, the particular virtual note (e.g. virtual slip 752) is selected responsive to a transition of physical arrangement 742 of the hand 702 from flat-hand hovering 702A-702C above the particular virtual note (e.g. virtual slip 752) to pinching 702D of its thumb and one or more fingers towards the particular virtual note (e.g. virtual slip 752). In yet other implementations, a selected virtual note (e.g. virtual slip 752) is deselected responsive to an expanding hand gesture.

In some implementations, selection of the virtual item (e.g. virtual slip 752) can be indicated by modifying a presentation property of the virtual item (e.g. virtual slip 752), including changing at least one of position, orientation, color, size, shape, texture, and transparency of at least a portion of the virtual item (e.g. virtual slip 752). As depicted in FIG. 7, AR generation system 106 updates graphics of the virtual slip 752 upon selection.

Figure 8:
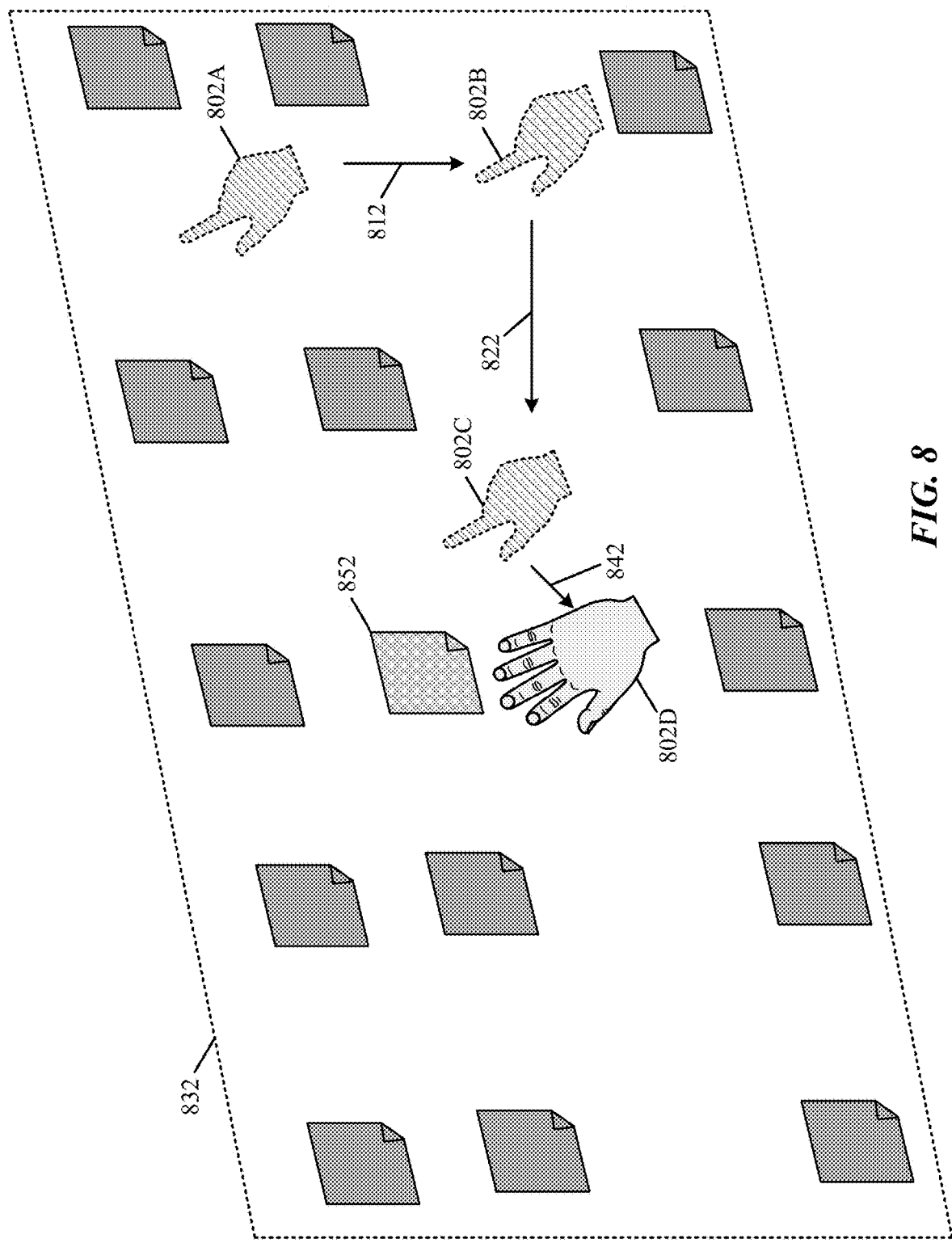
FIG. 8 depicts one implementation of selecting a particular virtual object in response to a transition of physical arrangement of a hand from one-finger pointing to immediate opening of the hand.

FIG. 8 depicts one implementation of selecting 800 a particular virtual object (e.g. virtual slip 852) in a virtual modality 832 responsive to a transition of physical arrangement of a hand 802 from one-finger pointing 802A-802C to immediate opening of the hand 802D. As shown in FIG. 8, a particular virtual note (e.g. virtual slip 852) is identified for selection responsive to a one-finger point gesture of the hand 802A-802C towards the particular virtual note (e.g. virtual slip 852). A vertical extent of navigation 812 is defined along a first axis in proportion to length of a vertical sweep of the hand 802 in the 3D sensory space. Also, a horizontal extent of navigation 822 is defined along a second axis in proportion to length of a horizontal sweep of the hand 802 in the 3D sensory space, such that the second axis is perpendicular to the first axis. Further, the particular virtual note (e.g. virtual slip 852) is selected responsive to a transition of physical arrangement 842 of the hand 802 from one-finger point gesture of the hand 802A-802C towards the particular virtual note (e.g. virtual slip 852) to immediate opening of the hand 802D above the particular virtual note (e.g. virtual slip 852). In yet other implementations, a selected virtual note (e.g. virtual slip 852) is deselected responsive to clenching of the hand 802D.

In some implementations, selection of the virtual item (e.g. virtual slip 852) can be indicated by modifying a presentation property of the virtual item (e.g. virtual slip 852), including changing at least one of position, orientation, color, size, shape, texture, and transparency of at least a portion of the virtual item (e.g. virtual slip 852). As depicted in FIG. 8, AR generation system 106 updates graphics of the virtual slip 852 upon selection.

Figure 9:
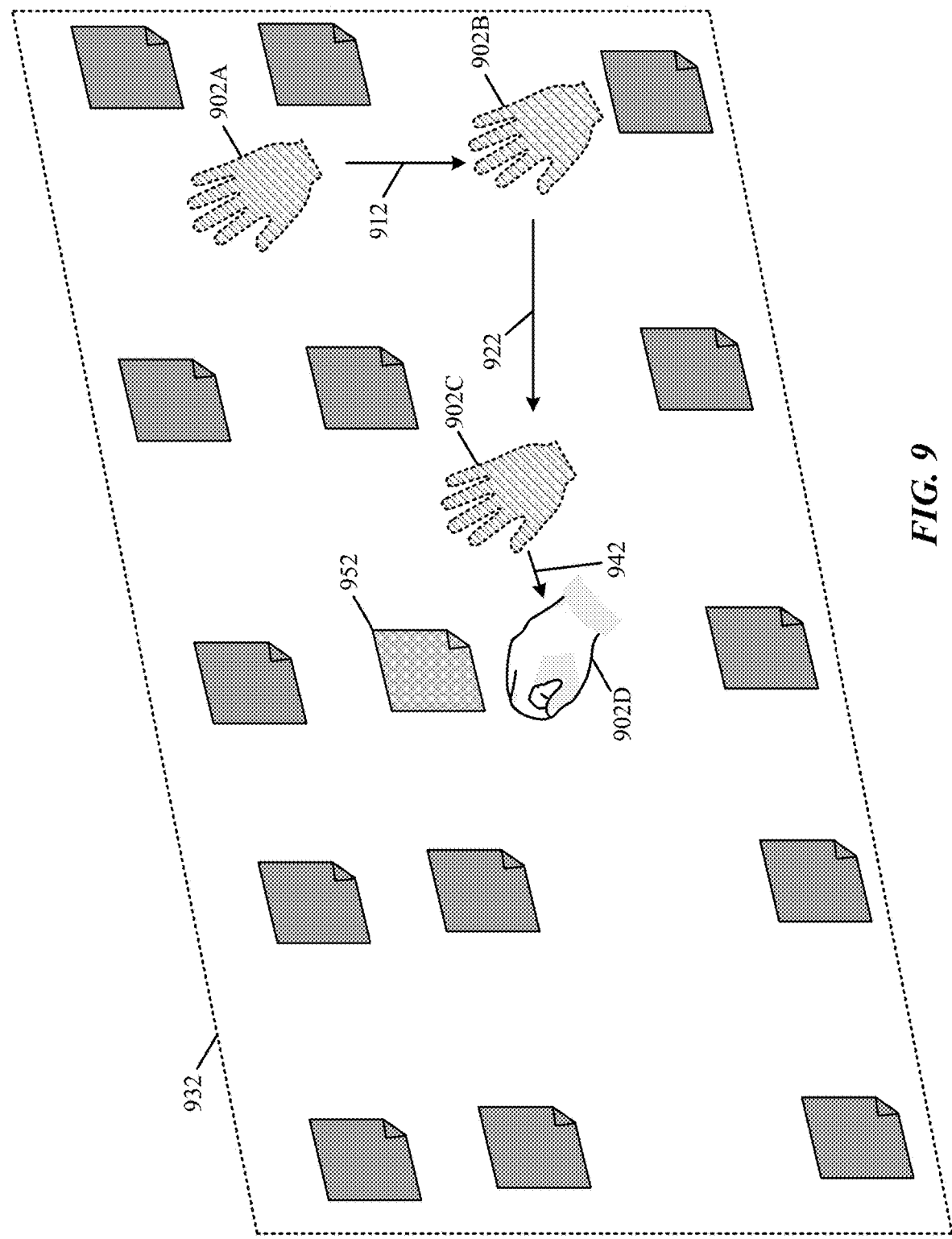
FIG. 9 shows one implementation of selecting a particular virtual object in response to a transition of physical arrangement of a hand from flat-hand hovering gesture to curling gesture.

FIG. 9 shows one implementation of selecting 900 a particular virtual object (e.g. virtual slip 952) in a virtual modality 932 responsive to a transition of physical arrangement of a hand 902 from flat-hand hovering gesture 902A-902C to curling gesture 902D. As shown in FIG. 9, a particular virtual note (e.g. virtual slip 952) is identified for selection responsive to flat-hand hovering 902A-902C of the hand 902 above the particular virtual note (e.g. virtual slip 952). A vertical extent of navigation 912 is defined along a first axis in proportion to length of a vertical sweep of the hand 902 in the 3D sensory space. Also, a horizontal extent of navigation 922 is defined along a second axis in proportion to length of a horizontal sweep of the hand 902 in the 3D sensory space, such that the second axis is perpendicular to the first axis. Further, the particular virtual note (e.g. virtual slip 952) is selected responsive to a transition of physical arrangement 942 of the hand 902 from flat-hand hovering 902A-902C above the particular virtual note (e.g. virtual slip 952) to curling of its thumb and fingers 902D above the particular virtual note (e.g. virtual slip 952). In yet other implementations, a selected virtual note (e.g. virtual slip 952) is deselected responsive to an expanding of thumb and fingers of the hand 902D.

In some implementations, selection of the virtual item (e.g. virtual slip 952) can be indicated by modifying a presentation property of the virtual item (e.g. virtual slip 952), including changing at least one of position, orientation, color, size, shape, texture, and transparency of at least a portion of the virtual item (e.g. virtual slip 952). As depicted in FIG. 9, AR generation system 106 updates graphics of the virtual slip 952 upon selection.

Figure 10:
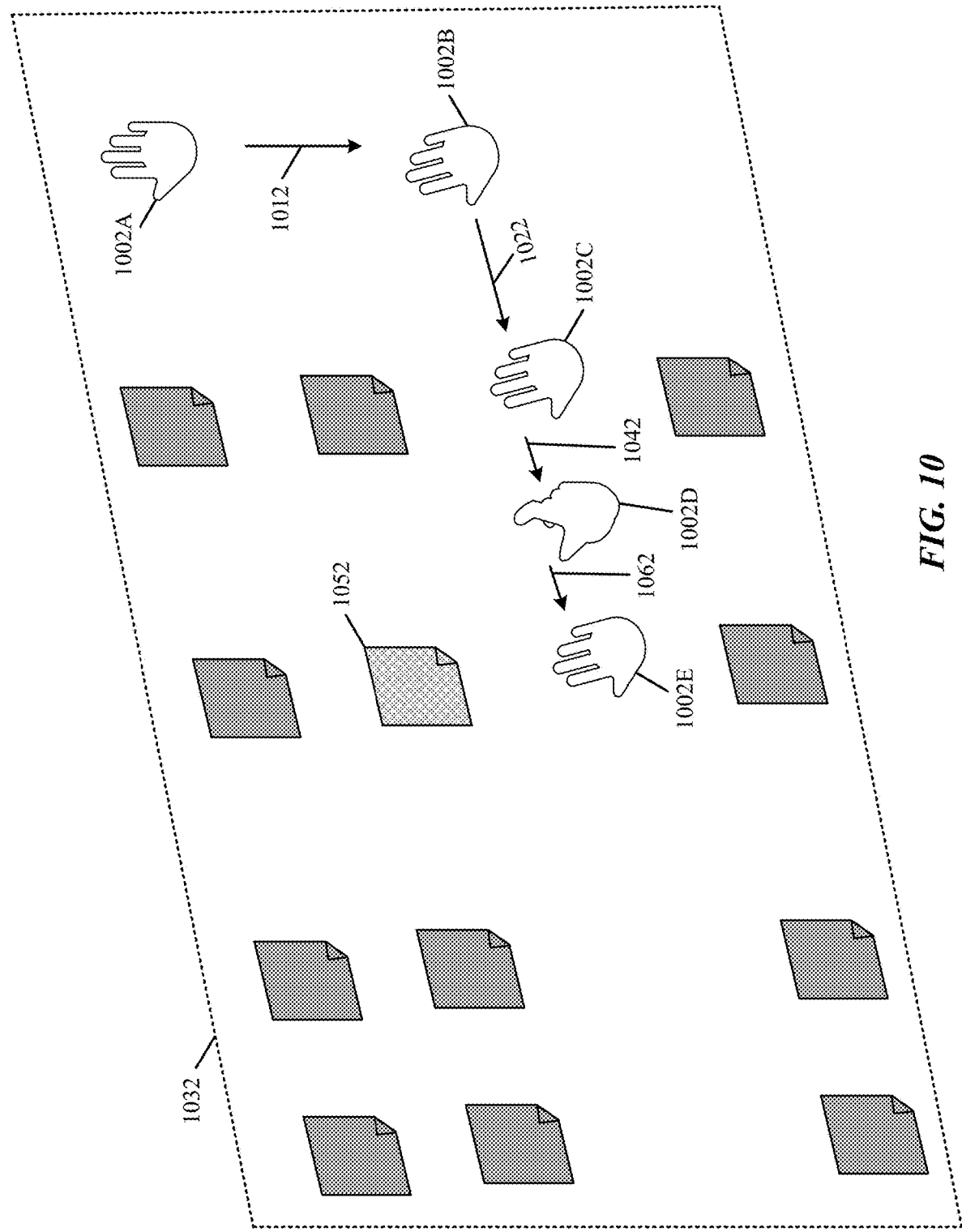
FIG. 10 is one implementation of selecting a particular virtual object in response to a transition of physical arrangement of a hand from bunched-fingers to spreading apart of the fingers and to immediate bunching of the fingers.

FIG. 10 is one implementation of selecting 1000 a particular virtual object (e.g. virtual slip 1052) in a virtual modality 1032 responsive to a transition of physical arrangement of a hand 1002 from bunched-fingers 1002A-1002C to spreading apart of the fingers 1002D and to immediate bunching of the fingers 1002E. As shown in FIG. 10, a particular virtual note (e.g. virtual slip 1052) is identified for selection responsive to bunched-fingers hovering 1002A-1002C of the hand 1002 above the particular virtual note (e.g. virtual slip 1052). A vertical extent of navigation 1012 is defined along a first axis in proportion to length of a vertical sweep of the hand 1002 in the 3D sensory space. Also, a horizontal extent of navigation 1022 is defined along a second axis in proportion to length of a horizontal sweep of the hand 1002 in the 3D sensory space, such that the second axis is perpendicular to the first axis. Further, the particular virtual note (e.g. virtual slip 1052) is selected responsive to a transition of physical arrangement 1042 of the hand 1002 from bunched-fingers hovering 1002C above the particular virtual note (e.g. virtual slip 1052) to spreading apart of the fingers 1002D above the particular virtual (e.g. virtual slip 1052) and to immediate bunching of the fingers 1002E (e.g. transition 1062). In yet other implementations, a selected virtual note (e.g. virtual slip 1052) is deselected responsive to a spreading apart of the fingers above the particular virtual note (e.g. virtual slip 1052) without a subsequent immediate bunching of the fingers.

In some implementations, selection of the virtual item (e.g. virtual slip 1052) can be indicated by modifying a presentation property of the virtual item (e.g. virtual slip 1052), including changing at least one of position, orientation, color, size, shape, texture, and transparency of at least a portion of the virtual item (e.g. virtual slip 1052). As depicted in FIG. 10, AR generation system 106 updates graphics of the virtual slip 1052 upon selection.

Figure 11:
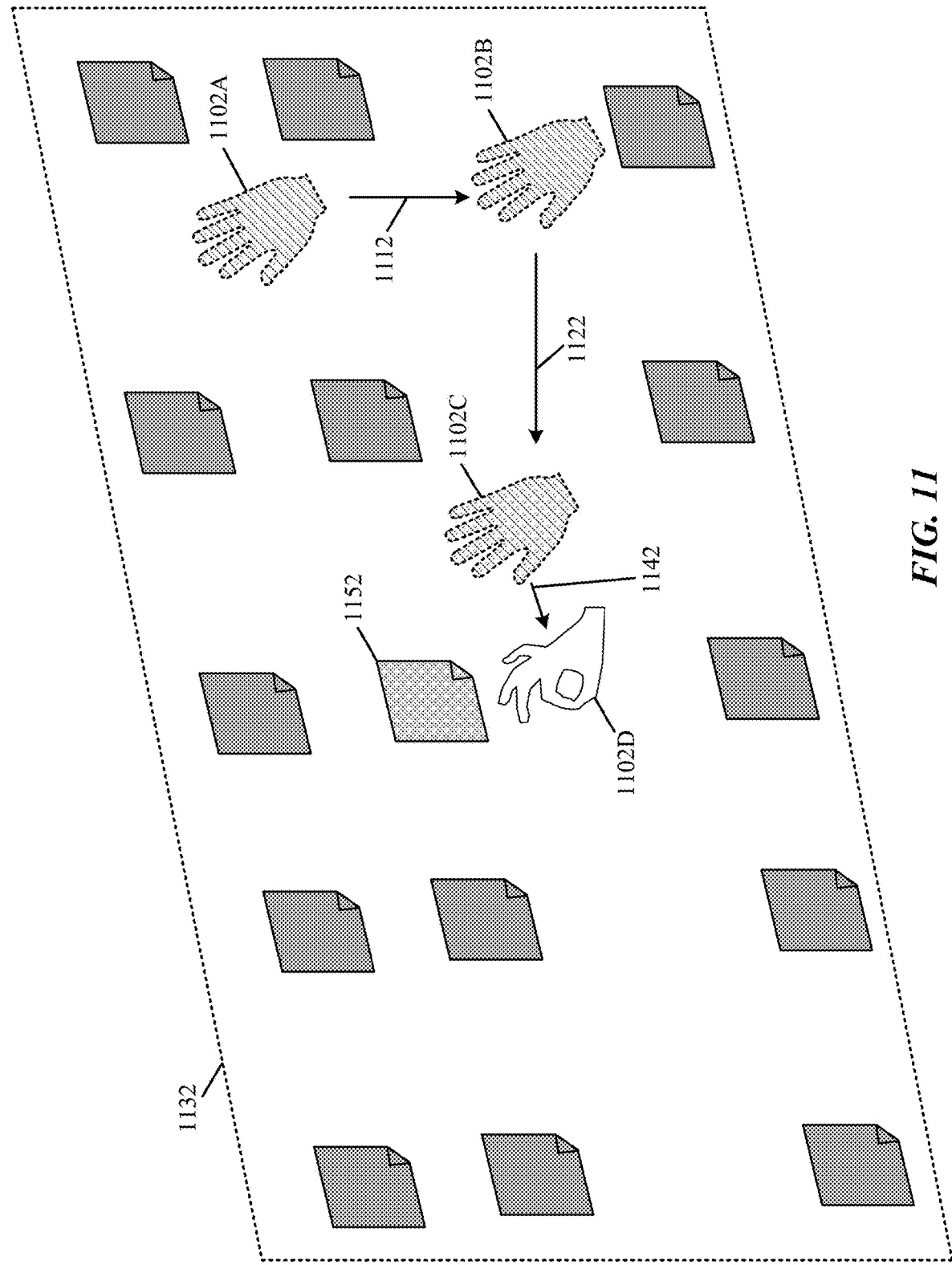
FIG. 11 is one implementation of selecting a particular virtual object in response to a transition of physical arrangement of a hand from flat-hand hovering gesture to okay gesture.

FIG. 11 is one implementation of selecting 1100 a particular virtual object (e.g. virtual slip 1152) in a virtual modality 1132 responsive to a transition of physical arrangement of a hand 1102 from flat-hand hovering gesture 1102A-1102C to okay gesture 1102D. As shown in FIG. 11, a particular virtual note (e.g. virtual slip 1152) is identified for selection responsive to flat-hand hovering 1102A-1102C of the hand 1102 above the particular virtual note (e.g. virtual slip 1152). A vertical extent of navigation 1112 is defined along a first axis in proportion to length of a vertical sweep of the hand 1102 in the 3D sensory space. Also, a horizontal extent of navigation 1122 is defined along a second axis in proportion to length of a horizontal sweep of the hand 1102 in the 3D sensory space, such that the second axis is perpendicular to the first axis. Further, the particular virtual note (e.g. virtual slip 1152) is selected responsive to a transition of physical arrangement 1142 of the hand 1102 from flat-hand hovering 1102A-1102C above the particular virtual note (e.g. virtual slip 1152) to curling of its thumb and index finger 1102D above the particular virtual (e.g. virtual slip 1152) and vertical expansion of other fingers (i.e. okay gesture). In yet other implementations, a selected virtual note (e.g. virtual slip 1152) is deselected responsive to a paralleling of the thumb and the fingers of the hand 1102.

In some implementations, selection of the virtual item (e.g. virtual slip 1152) can be indicated by modifying a presentation property of the virtual item (e.g. virtual slip 1152), including changing at least one of position, orientation, color, size, shape, texture, and transparency of at least a portion of the virtual item (e.g. virtual slip 1152). As depicted in FIG. 11, AR generation system 106 updates graphics of the virtual slip 1152 upon selection.

Figure 12A:
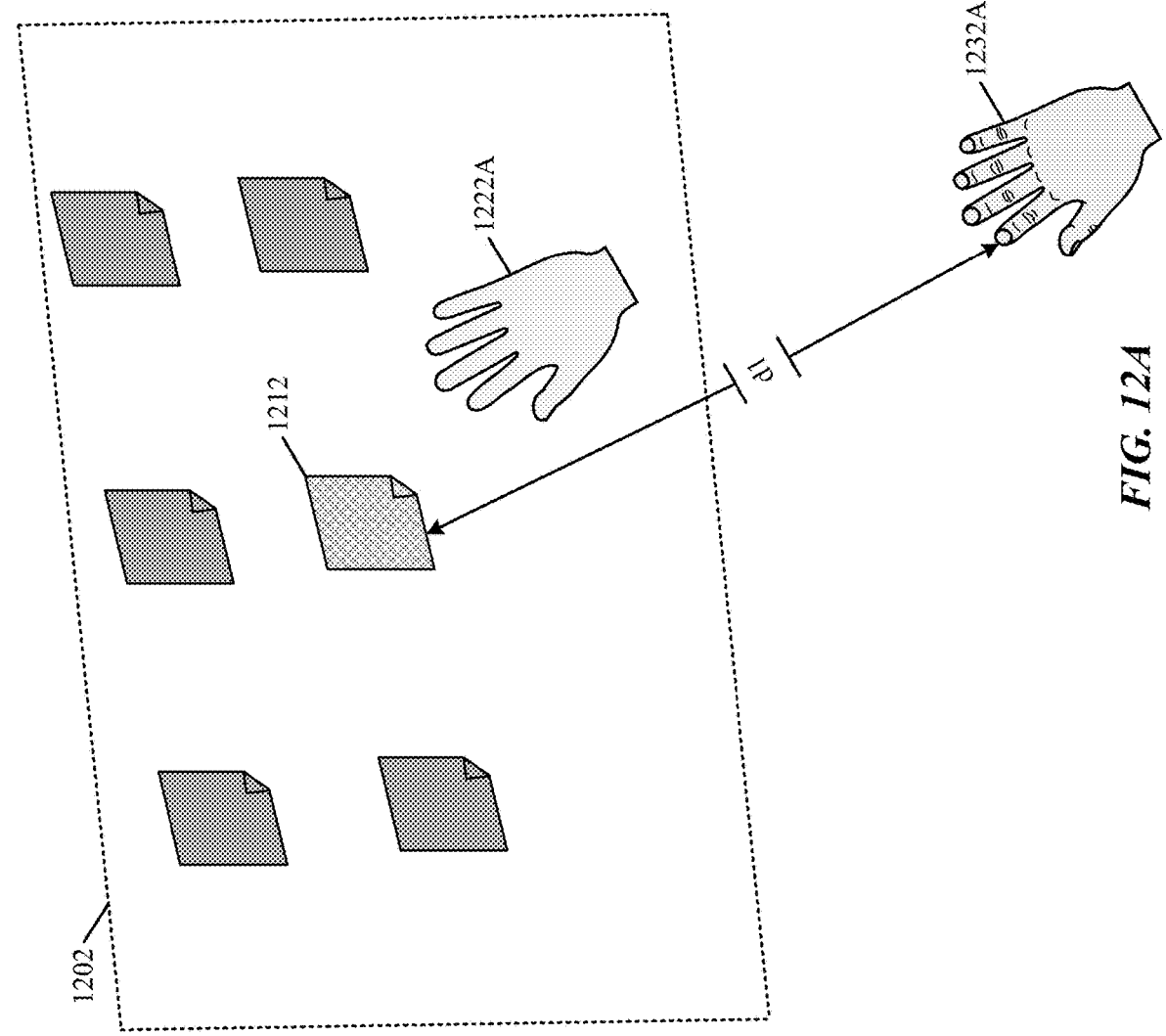
FIGS. 12A, 12B and 12C illustrate one implementation of generating for display a proximity indicator for a hand and automatically selecting a particular virtual object when the hand approaches the virtual object within an initial hover proximity threshold.
Figure 12B:
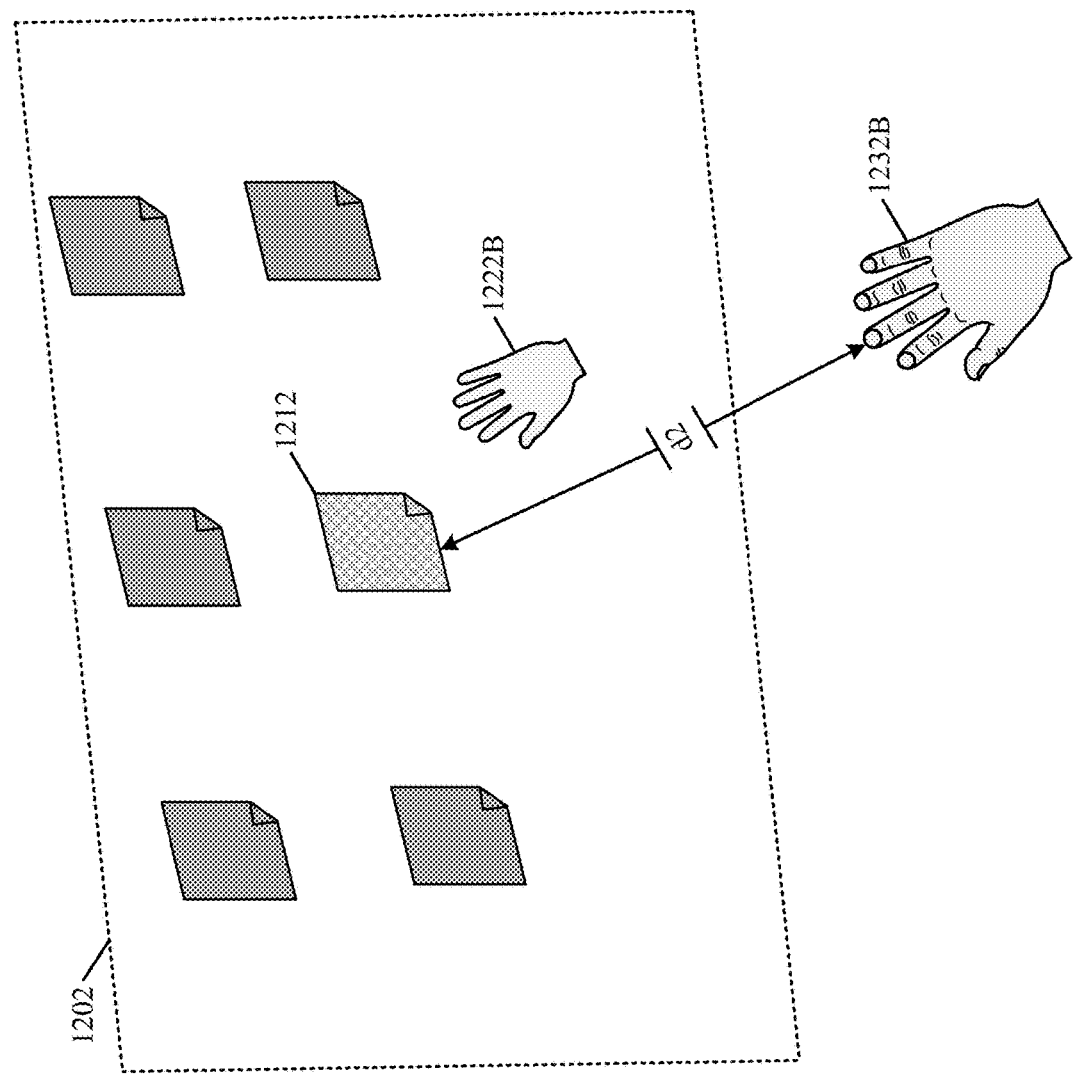
Figure 12C:
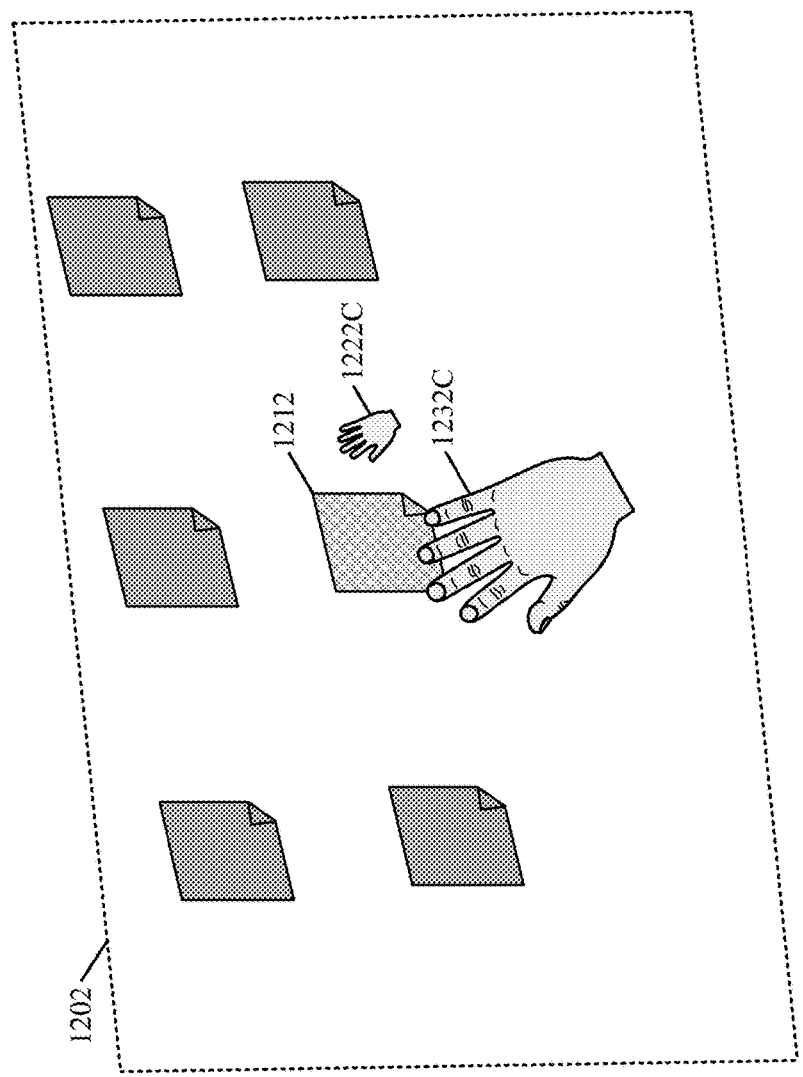

FIGS. 12A-12C illustrate one implementation of generating for display a proximity indicator 1222A-1222C for a hand 1232 and automatically selecting 1200A-1200C a particular virtual object (e.g. virtual slip 1212) in a virtual modality 1202 when the hand approaches the virtual object (e.g. virtual slip 1212) within an initial hover proximity threshold. In one implementation, a proximity indicator 1222A-1222C is generated for display that provides visual feedback regarding proximity (e.g. distances d1, d2) of the hand 1232 to a particular virtual note (e.g. virtual slip 1212) and escalation from proximity 1232A-1232B to contact 1232C of the hand 1232 with the particular virtual note (e.g. virtual slip 1212).

Custom logic for proximity indicator 1222 is defined such that proximity indicator 1222A-1222C is larger in size when the hand 1232 is farther away at distance d1 from the virtual slip 1212 than it is closer at distance d2, thus being proportionally responsive to the distance between the hand 1232 and the virtual slip 1212. At action 1200A in FIG. 12A, hand 1232A is at an initial distance d1 from the virtual slip 1212 and thus the proximity indicator 1222 is of an initial size 1222A. At action 1200B in FIG. 12B, as the hand 1232 approaches the virtual slip 1212 at 1232B to a distance d2, the proximity indicator 1222 modifies to a smaller size 1222B. Further, when the hand 1232 comes in contact with the virtual slip 1212 at 1232C in FIG. 12C, the proximity indicator 1222 is updated by the AR generation system 106 to an even further smaller size 1222C and the virtual slip 1212 is automatically selected in response. In other implementations, the virtual slip 1212 is automatically selected when the virtual slip 1212 within an initial hover proximity threshold of the hand 1232.

In some implementations, selection of the virtual item (e.g. virtual slip 1212) can be indicated by modifying a presentation property of the virtual item (e.g. virtual slip 1212), including changing at least one of position, orientation, color, size, shape, texture, and transparency of at least a portion of the virtual item (e.g. virtual slip 1212). As depicted in FIGS. 12A-12B, AR generation system 106 updates graphics of the virtual slip 1212 upon selection. In other implementations, the generated display further includes modifying at least one or combination of appearance, shape, or opacity of the proximity indicator 1222 responsive to distance between the hand 1232 and the particular virtual slip 1212.

Figure 13A:
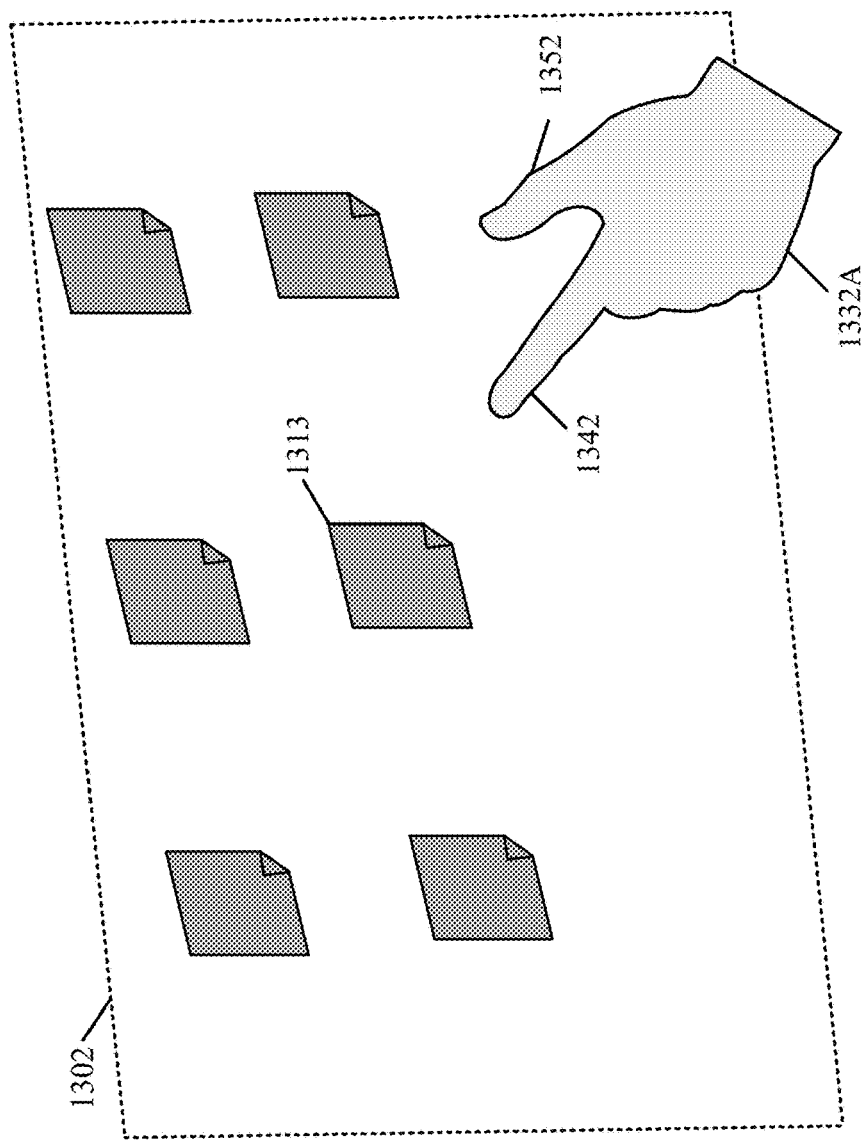
FIGS. 13A and 13B depict one implementation of selecting a particular virtual object in response to firing of finger gun.
Figure 13B:
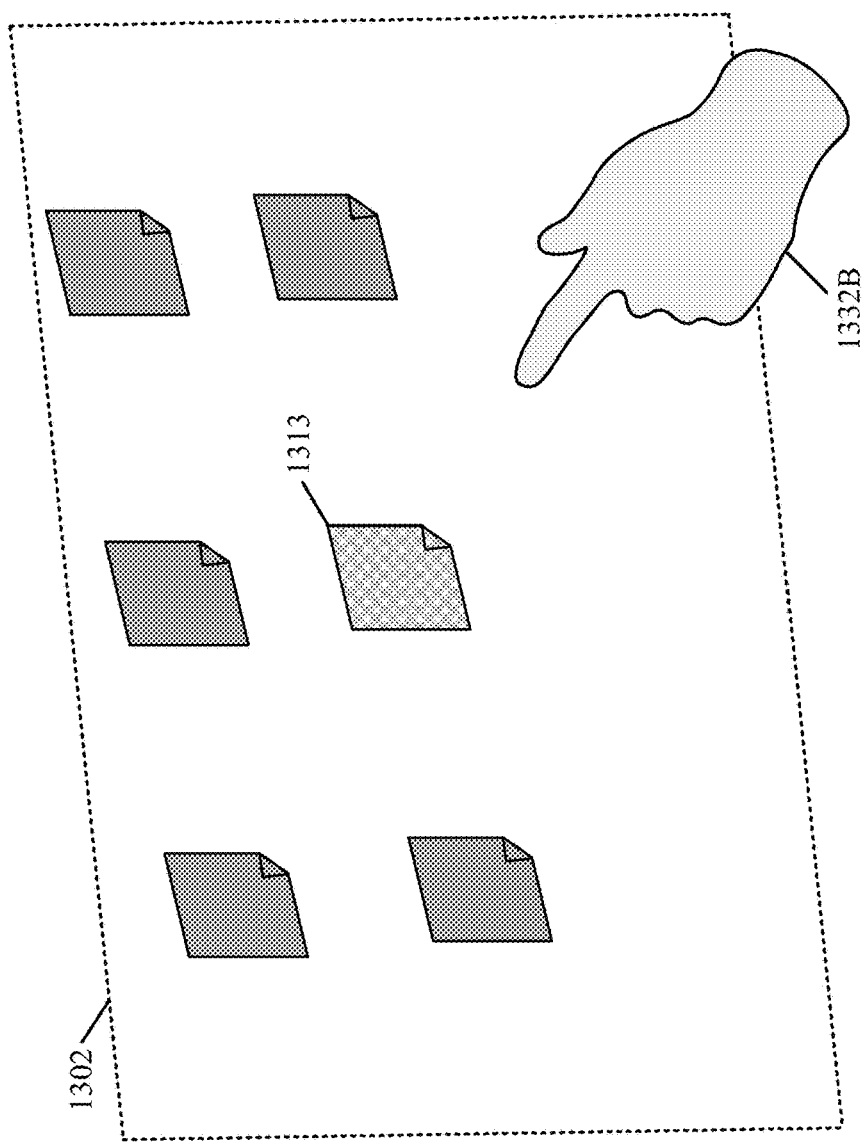

FIGS. 13A-13B depict one implementation of selecting 1300A-1300B a particular virtual object (e.g. virtual slip 1313) in a virtual modality 1302 responsive to firing 1332B of finger gun 1332A. As shown in FIGS. 13A-13B, a particular virtual note (e.g. virtual slip 1313) is identified for selection responsive to a one-finger point 1332A of the finger gun 1332 towards the particular virtual note 1313. Further, the particular virtual note (e.g. virtual slip 1313) is selected responsive to a transition of physical arrangement of the finger gun 1332 from one-finger pointing 1332A towards the particular virtual note 1313 to inward curling of a finger 1342 used to perform the one-finger pointing 1332A. In one implementation, the one-finger pointing is performed using an index finger. In other implementations, a selected virtual note 1313 is deselected responsive to outward curling of the finger used to perform the one-finger pointing. In yet other implementations, the particular virtual note (e.g. virtual slip 1313) is selected responsive to a transition of physical arrangement of the finger gun 1332 from one-finger pointing 1332A towards the particular virtual note 1313 to inward curling of a thumb 1352 of the finger gun 1332.

In some implementations, selection of the virtual item (e.g. virtual slip 1313) can be indicated by modifying a presentation property of the virtual item (e.g. virtual slip 1313), including changing at least one of position, orientation, color, size, shape, texture, and transparency of at least a portion of the virtual item (e.g. virtual slip 1313). As depicted in FIG. 13B, AR generation system 106 updates graphics of the virtual slip 1313 upon selection.

Figure 14A:
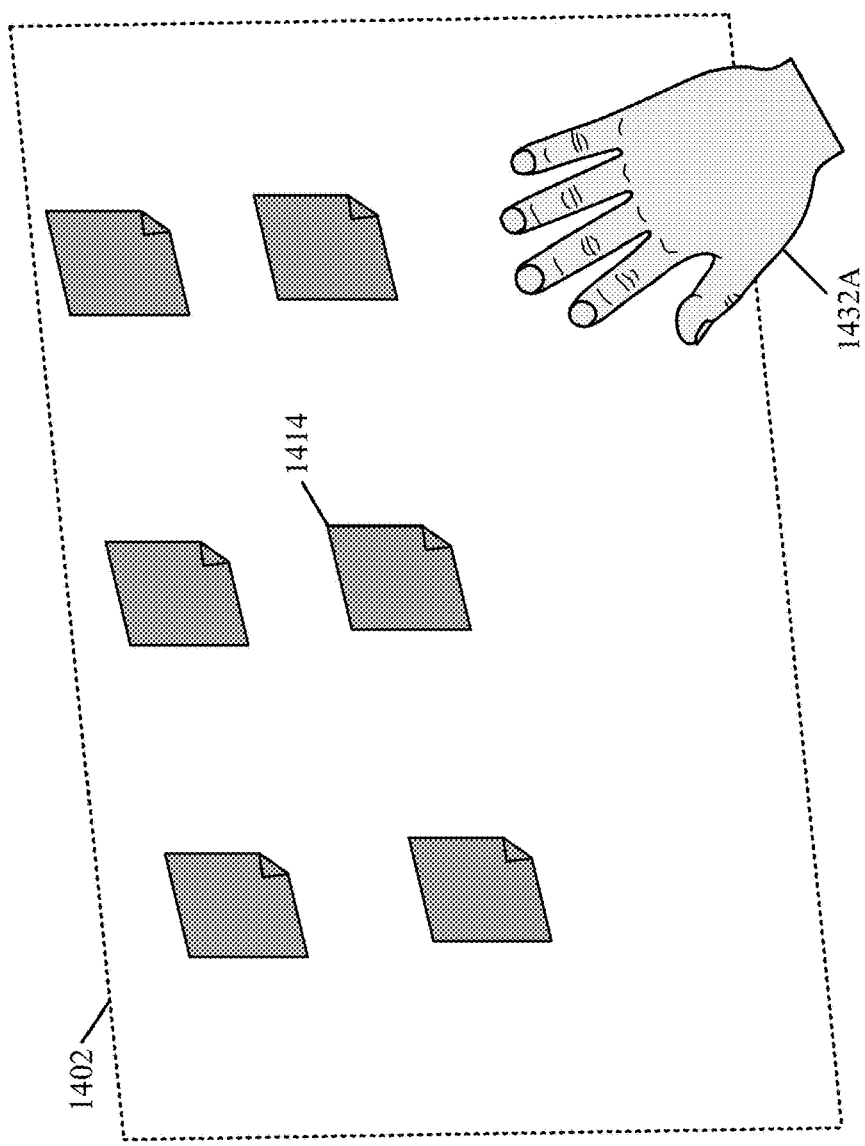
FIGS. 14A and 14B are one implementation of selecting a particular virtual object in response to rotation of a hand.
Figure 14B:
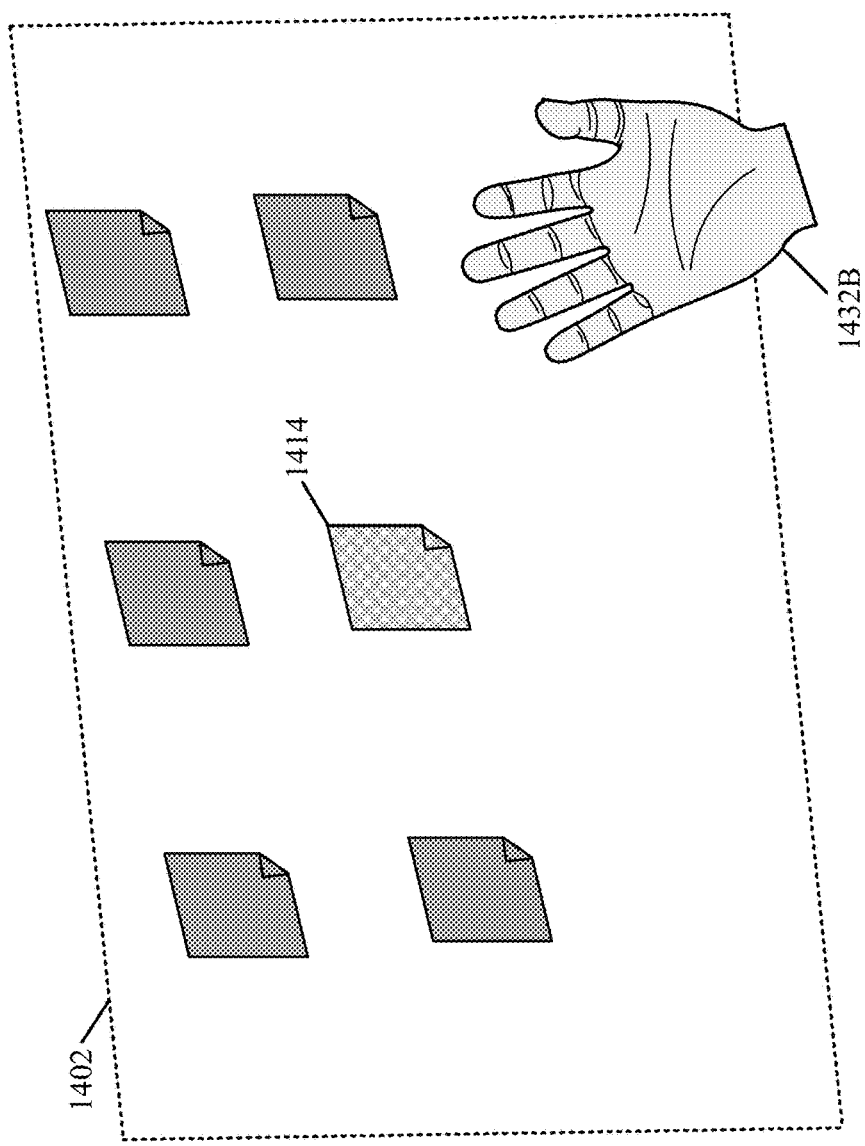

FIGS. 14A-14B are one implementation of selecting 1400A-1400B a particular virtual object (e.g. virtual slip 1414) in response to rotation 1432B of a hand 1432A. As shown in FIGS. 14A-14B, a particular virtual note (e.g. virtual slip 1414) is identified for selection responsive to a prone flat-hand hovering 1432A of a hand 1432 above the particular virtual note 1414 in the virtual modality 1402. Further, the particular virtual note (e.g. virtual slip 1414) is selected responsive to a transition of physical arrangement of the hand 1432 from pronation 1432A illustrated in FIG. 14A to supination 1432B illustrated in FIG. 14B when the hand 1432 turns from a prone position 1432A to a supine position 1432B while hovering over the particular virtual note 1414. In other implementations, a selected virtual note 1414 is deselected responsive to supination of the prone flat-hand hovering over the particular virtual note 1414.

In some implementations, selection of the virtual item (e.g. virtual slip 1414) can be indicated by modifying a presentation property of the virtual item (e.g. virtual slip 1414), including changing at least one of position, orientation, color, size, shape, texture, and transparency of at least a portion of the virtual item (e.g. virtual slip 1414). As depicted in FIG. 14B, AR generation system 106 updates graphics of the virtual slip 1414 upon selection.

Virtual Reality Operating System

The technology disclosed provides a rare opportunity to achieve a quantum leap in human computer interaction by combining virtual reality interfaces with gestural inputs. The traditional paradigms of indirect interactions through standard input devices such as mouse, keyboard, or stylus have their limitations, including skewed fields of view and restrictively receptive interfaces. The technology disclosed presents a virtual paradigm that can be used to created 3D user interfaces layers, applications, programs, operating system APIs, which mimic and are analogous to pre-existing "windows, icons, menus, pointer" (WIMP) interactions and operating system kernel.

In one implementation, a user can instantiate free-floating virtual interfaces, called "virtual modalities" such as screens and panels and then interacts with them using free-form gestures, as described above in this application. The technology disclosed allows a user to create any number of these virtual modalities and to assign them any dimension, size, shape, color, or orientation. In another implementation, these virtual modalities can be manipulated extrinsically via gestures such that the user can move them in the real-world space, close or remove them, leave them running, bring them in forefront, split them, stack one over the other, or arrange them in a pattern or formation.

The technology disclosed further allows users to intrinsically operate a virtual desktop hosted by the virtual modalities in intuitive ways using gestures. For example, gestures can be used to perform traditional manipulations of virtual files, folders, text editors, spreadsheets, databases, paper sheets, recycling bin, windows, or clipboards that represent their pre-existing counterparts. Such manipulations can include—the user picking up a virtual object and bringing it to their desired destination, running searches or flipping through with their hands and find what is need, trashing unwanted virtual items by picking them and dropping them into the virtual recycling bin, pointing towards virtual song files to be played, pulling a blank virtual paper and begin typing, pulling-down a virtual menu, selecting a virtual icon, rotating a 3D image for 360 degree inspection, moving forward into the windows envelope with a forward sweep, moving backward into the windows envelope with a backward sweep, bringing in contact a first file icon with an application or program icon using a two-hand inward swipe to open the corresponding file with the application or program, and the like.

Flowcharts

Figure 15:
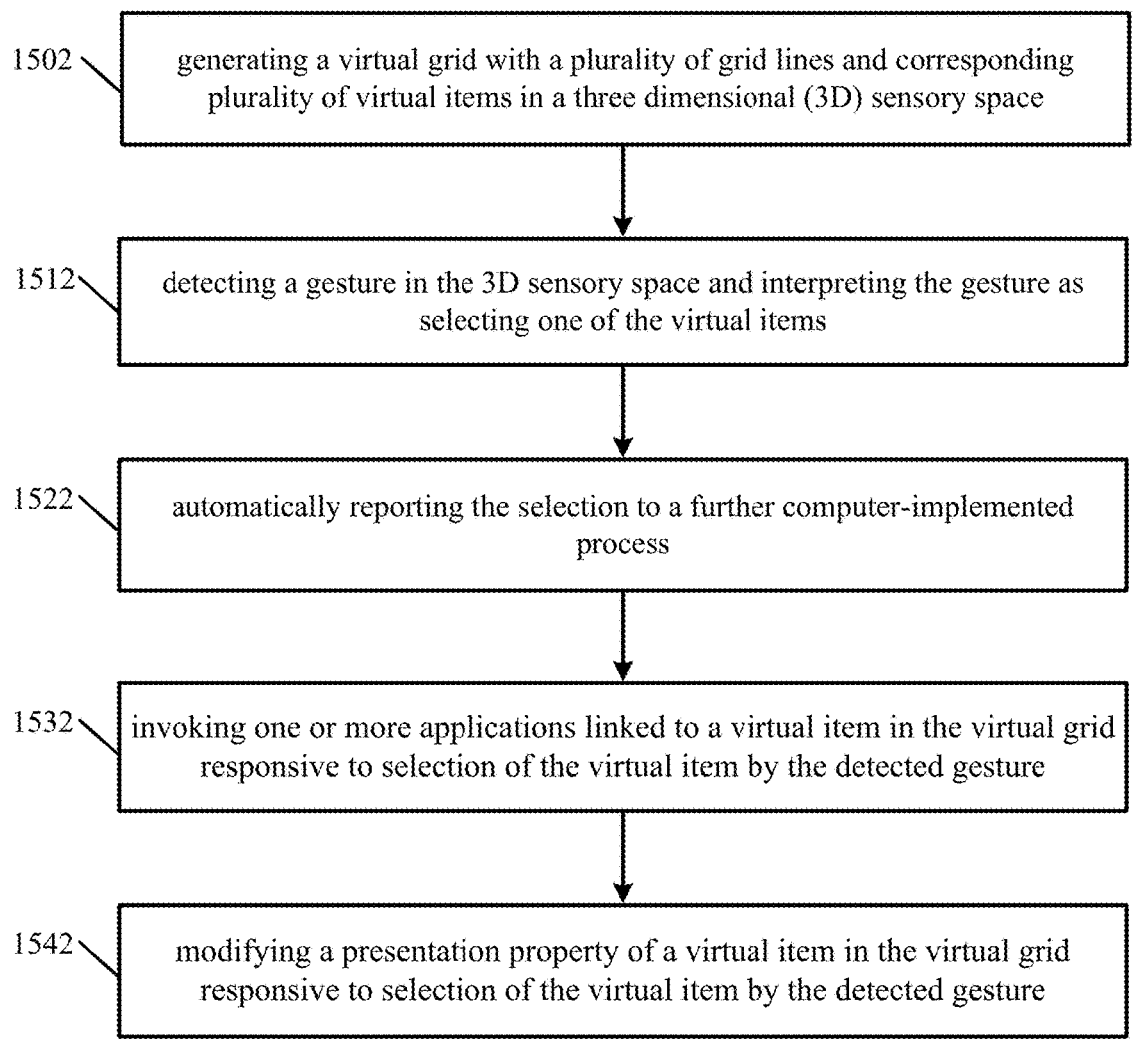
FIG. 15 illustrates one implementation of a method of selecting a virtual item from a virtual grid in a three-dimensional (3D) sensory space.

FIG. 15 illustrates one implementation of a method 1500 of selecting a virtual item from a virtual grid in a three-dimensional (3D) sensory space. At action 1502, a virtual grid is generated, optionally with a plurality of grid lines, and corresponding plurality of virtual items responsive to gestures in a three-dimensional (3D) sensory space. In one implementation, each virtual item is in visual correspondence with a different set of gridlines. In other implementations, the virtual grid is at least one of polygonic, circular, and globate.

At action 1512, a gesture is detected in the 3D sensory space and interpreted as selecting one of the virtual items.

At action 1522, the selection is automatically reported to a further computer-implemented process.

At action 1532, one or more applications linked to a virtual item in the virtual grid are invoked responsive to selection of the virtual item by the detected gesture.

At action 1542, the presentation of the virtual item is modified, including changing at least one of position, orientation, color, size, shape, texture, and transparency of at least a portion of the virtual item. In one implementation, modifying the presentation of the virtual item includes augmenting the virtual item with additional graphics.

This method and other implementations of the technology disclosed can include one or more of the following features and/or features described in connection with additional methods disclosed. Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

Figure 16:
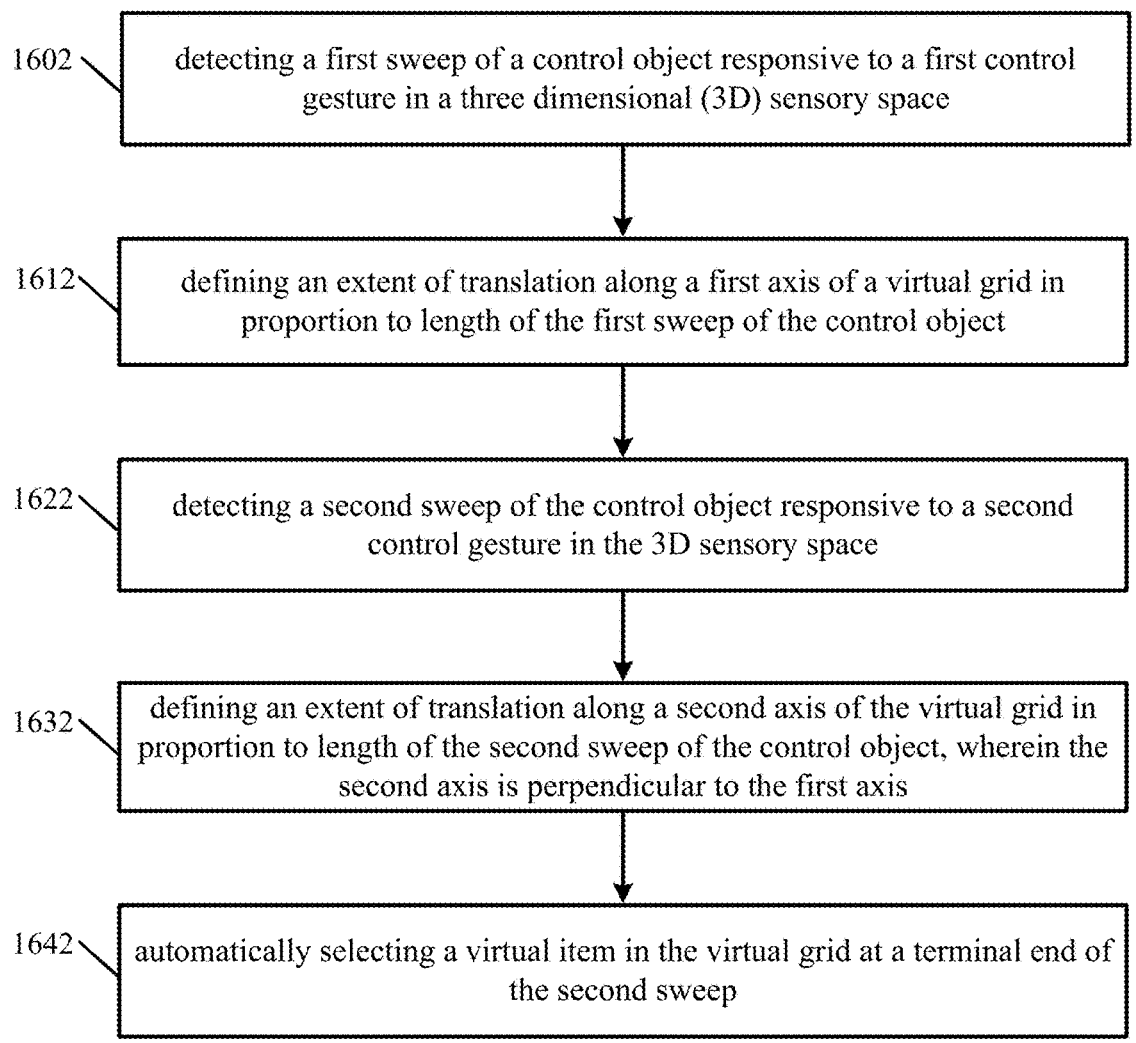
FIG. 16 is a flowchart showing a method of navigating a virtual modality displaying a plurality of virtual items arranged in a grid.

FIG. 16 is a flowchart showing a method 1600 of navigating a virtual modality displaying a plurality of virtual items arranged in a grid. At action 1602, a first sweep of a control object is detected responsive to a first control gesture in a three-dimensional (3D) sensory space.

At action 1612, an extent of translation is defined along a first axis of a virtual grid in proportion to length of the first sweep of the control object.

At action 1622, a second sweep of the control object is detected responsive to a second control gesture in the 3D sensory space.

At action 1632, an extent of translation is defined along a second axis of the virtual grid in proportion to length of the second sweep of the control object, wherein the second axis is perpendicular to the first axis.

At action 1642, a virtual item in the virtual grid is automatically selected at a terminal end of the second sweep.

In one implementation, the first sweep is a horizontal sweep. In another implementation, the second sweep is a vertical sweep. In yet another implementation, the first sweep is a vertical sweep.

In one implementation, the second sweep is a horizontal sweep. In another implementation, the first sweep is a horizontal sweep. In yet another implementation, the second sweep is a diagonal sweep.

In one implementation, the first sweep is a diagonal sweep. In another implementation, the second sweep is a horizontal sweep. In yet another implementation, the first sweep is a vertical sweep.

In one implementation, the second sweep is a diagonal sweep. In another implementation, the first sweep is a diagonal sweep. In yet another implementation, the second sweep is a vertical sweep.

In some implementations, a third sweep of the control object is detected responsive to a third control gesture in the 3D sensory space. Also, an extent of translation is defined along a third axis of the virtual grid in proportion to length of the second sweep of the control object, wherein the third axis is perpendicular to the first and second axis. Further, a virtual item in the virtual grid is automatically selected at a terminal end of the third sweep.

In one implementation, the third sweep is a horizontal sweep. In another implementation, the third sweep is a vertical sweep. In yet another implementation, the third sweep is a diagonal sweep.

This method and other implementations of the technology disclosed can include one or more of the following features and/or features described in connection with additional methods disclosed. Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

Particular Implementations

In one implementation, a method of selecting a virtual item from a virtual grid in a three-dimensional (3D) sensory space is described. The method includes generating a virtual grid with a plurality of grid lines and corresponding plurality of virtual items responsive to gestures in a three-dimensional (3D) sensory space, wherein each virtual item is in visual correspondence with a different set of gridlines, detecting a gesture in the 3D sensory space and interpreting the gesture as selecting one of the virtual items, and automatically reporting the selection to a further computer-implemented process.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as gesture recognition system, computer system, augmented reality, gestural interactions, virtual reality operating system, or flowcharts.

The method also includes invoking one or more applications linked to a virtual item in the virtual grid responsive to selection of the virtual item by the detected gesture. It further includes modifying a presentation property of a virtual item in the virtual grid responsive to selection of the virtual item by the detected gesture. In one implementation, modifying the presentation of the virtual item includes changing at least one of position, orientation, color, size, shape, texture, and transparency of at least a portion of the virtual item. In another implementation, modifying the presentation of the virtual item includes augmenting the virtual item with additional graphics.

In one implementation, the virtual grid is polygonic. In another implementation, the virtual grid is circular. In yet another implementation, the virtual grid is globate.

The method further includes generating the virtual grid using at least holographic chip projects.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In another implementation, a method of navigating a virtual modality displaying a plurality of virtual items arranged in a grid is described. The method includes detecting a first sweep of a control object responsive to a first control gesture in a three-dimensional (3D) sensory space, defining an extent of translation along a first axis of a virtual grid in proportion to length of the first sweep of the control object, detecting a second sweep of the control object responsive to a second control gesture in the 3D sensory space, defining an extent of translation along a second axis of the virtual grid in proportion to length of the second sweep of the control object, wherein the second axis is perpendicular to the first axis, and automatically selecting a virtual item in the virtual grid at a terminal end of the second sweep.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as gesture recognition system, computer system, augmented reality, gestural interactions, virtual reality operating system, or flowcharts.

The method also includes invoking one or more applications linked to a virtual item in the virtual grid responsive to selection of the virtual item by the detected gesture. It further includes modifying a presentation property of a virtual item in the virtual grid responsive to selection of the virtual item by the detected gesture. In one implementation, modifying the presentation of the virtual item includes changing at least one of position, orientation, color, size, shape, texture, and transparency of at least a portion of the virtual item. In another implementation, modifying the presentation of the virtual item includes augmenting the virtual item with additional graphics.

In one implementation, the first sweep is a horizontal sweep. In another implementation, the second sweep is a vertical sweep.

In one implementation, the first sweep is a vertical sweep. In another implementation, the second sweep is a horizontal sweep.

In one implementation, the first sweep is a horizontal sweep. In another implementation, the second sweep is a diagonal sweep.

In one implementation, the first sweep is a diagonal sweep. In another implementation, the second sweep is a horizontal sweep.

In one implementation, the first sweep is a vertical sweep. In another implementation, the second sweep is a diagonal sweep.

In one implementation, the first sweep is a diagonal sweep. In another implementation, the second sweep is a vertical sweep.

In one implementation, the method further includes generating the virtual grid using at least holographic chip projects.

In another implementation, the method further include detecting a third sweep of the control object responsive to a third control gesture in the 3D sensory space, defining an extent of translation along a third axis of the virtual grid in proportion to length of the second sweep of the control object, wherein the third axis is perpendicular to the first and second axis, and automatically selecting a virtual item in the virtual grid at a terminal end of the third sweep.

In one implementation, the third sweep is a horizontal sweep. In another implementation, the third sweep is a vertical sweep. In yet another implementation, the third sweep is a diagonal sweep.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In yet another implementation, a method of navigating a virtual modality displaying a plurality of virtual items arranged in a grid is described. The method includes detecting a horizontal sweep of a control object responsive to a first control gesture in a three-dimensional (3D) sensory space, defining a horizontal extent of translation along a first axis of a virtual grid in proportion to length of the horizontal sweep of the control object, detecting a vertical sweep of the control object responsive to a second control gesture in the 3D sensory space, defining a vertical extent of translation along a second axis of the virtual grid in proportion to length of the vertical sweep of the control object, wherein the second axis is perpendicular to the first axis, and automatically selecting a virtual item in the virtual grid at a terminal end of the vertical sweep. This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as gesture recognition system, computer system, augmented reality, gestural interactions, virtual reality operating system, or flowcharts.

In one implementation, the horizontal sweep is a right gesture. In another implementation, the horizontal sweep is a left gesture. In yet another implementation, the vertical sweep is an upward gesture. In a further implementation, the vertical sweep is a downward gesture.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In a further implementation, a method of navigating a virtual modality displaying a plurality of virtual items arranged in a grid is described. The method includes detecting a vertical sweep of a control object responsive to a first control gesture in a three-dimensional (3D) sensory space, defining a vertical extent of translation along a first axis of a virtual grid in proportion to length of the vertical sweep of the control object, detecting a horizontal sweep of the control object responsive to a second control gesture in the 3D sensory space, defining a horizontal extent of translation along a second axis of the virtual grid in proportion to length of the horizontal sweep of the control object, wherein the second axis is perpendicular to the first axis, and automatically selecting a virtual item in the virtual grid at a terminal end of the horizontal sweep.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as gesture recognition system, computer system, augmented reality, gestural interactions, virtual reality operating system, or flowcharts.

In one implementation, the horizontal sweep is a right gesture. In another implementation, the horizontal sweep is a left gesture. In yet another implementation, the vertical sweep is an upward gesture. In a further implementation, the vertical sweep is a downward gesture.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In a further implementation, a method of navigating a virtual modality displaying a plurality of virtual items arranged in a grid is described. The method includes detecting a vertical sweep of a control object responsive to a first control gesture in a three-dimensional (3D) sensory space, defining a vertical extent of translation along a first axis of a virtual grid in proportion to length of the vertical sweep of the control object, detecting a diagonal sweep of the control object responsive to a second control gesture in the 3D sensory space, defining a diagonal extent of translation along a second axis of the virtual grid in proportion to length of the diagonal sweep of the control object, wherein the second axis is perpendicular to the first axis, and automatically selecting a virtual item in the virtual grid at a terminal end of the diagonal sweep.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as gesture recognition system, computer system, augmented reality, gestural interactions, virtual reality operating system, or flowcharts.

In one implementation, the vertical sweep is an upward gesture. In another implementation, the vertical sweep is a downward gesture. In yet another implementation, the diagonal sweep is an upward gesture. In a further implementation, the diagonal sweep is a downward gesture.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In one implementation, a method of navigating a virtual modality displaying a plurality of virtual items arranged in a grid is described. The method includes detecting a horizontal sweep of a control object responsive to a first control gesture in a three-dimensional (3D) sensory space, defining a horizontal extent of translation along a first axis of a virtual grid in proportion to length of the horizontal sweep of the control object, detecting a diagonal sweep of the control object responsive to a second control gesture in the 3D sensory space, defining a diagonal extent of translation along a second axis of the virtual grid in proportion to length of the diagonal sweep of the control object, wherein the second axis is perpendicular to the first axis, and automatically selecting a virtual item in the virtual grid at a terminal end of the diagonal sweep.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as gesture recognition system, computer system, augmented reality, gestural interactions, virtual reality operating system, or flowcharts.

In one implementation, the horizontal sweep is an upward gesture. In another implementation, the horizontal sweep is a downward gesture. In yet another implementation, the diagonal sweep is an upward gesture. In a further implementation, the diagonal sweep is a downward gesture.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In another implementation, a method of navigating a virtual modality displaying a plurality of virtual items arranged in a grid is described. The method includes detecting a horizontal sweep of a control object responsive to a first control gesture in a three-dimensional (3D) sensory space, defining a horizontal extent of translation along a first axis of a virtual grid in proportion to length of the horizontal sweep of the control object, detecting a vertical sweep of the control object responsive to a second control gesture in the 3D sensory space, defining a vertical extent of translation along a second axis of the virtual grid in proportion to length of the vertical sweep of the control object, wherein the second axis is perpendicular to the first axis, and automatically selecting a virtual item in the virtual grid at a terminal end of the vertical sweep responsive to a terminal gesture that transitions the control object from one physical arrangement to another.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as gesture recognition system, computer system, augmented reality, gestural interactions, virtual reality operating system, or flowcharts.

In one implementation, the control object is a hand. In another implementation, physical arrangements of the control object include at least a flat hand with thumb parallel to fingers. In yet another implementation, physical arrangements of the control object include at least open, closed, and half-open.

In one implementation, physical arrangements of the control object include at least pinched, curled, and fisted. In one implementation, physical arrangements of the control object include at least mime gun, okay sign, thumbs-up, and ILY sign. In yet another implementation, physical arrangements of the control object include at least one-finger point, two-finger point, thumb point, and pinkie point.

In one implementation, the horizontal sweep is a right gesture. In another implementation, the horizontal sweep is a left gesture. In yet another implementation, the vertical sweep is an upward gesture. In a further implementation, the vertical sweep is a downward gesture.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In yet another implementation, a method of posting a virtual note from a collection of virtual notes arranged in a grid is described. The method includes generating a virtual grid with a plurality of virtual notes responsive to gestures in a three-dimensional (3D) sensory space, detecting a first set of gestures in the 3D sensory space along a first and second axis, navigating the virtual grid responsive to the first set of gestures to locate a particular virtual note in the virtual grid, wherein the first and second axis are perpendicular to each other, detecting a second set of gestures in the 3D sensory space along a third axis, and removing the particular virtual note from the virtual grid and posting the virtual note on a virtual location determined by a terminal gesture in the second set of gestures, wherein the third axis is perpendicular to the first and second axis.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as gesture recognition system, computer system, augmented reality, gestural interactions, virtual reality operating system, or flowcharts.

In one implementation, the terminal gesture is a flick of a whole hand. In another implementation, the terminal gesture is a flick of one of individual fingers or thumb of a hand. In yet another implementation, the terminal gesture is a flick of a set of bunched fingers or bunched fingers and thumb of a hand.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In one implementation, a method of selecting a virtual note from a collection of virtual notes arranged in a grid is described. The method includes generating a virtual grid with a plurality of virtual notes responsive to gestures in a three-dimensional (3D) sensory space, automatically selecting a particular virtual note from the virtual grid responsive to a prone inward scoop hand gesture in the 3D sensory space, including identifying the particular virtual note for selection responsive to positioning a hand behind the particular virtual note in the virtual grid and selecting the particular virtual note responsive to a transition of physical arrangement of the hand from a resting position behind the particular virtual note to an inward scoop towards the particular virtual.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as gesture recognition system, computer system, augmented reality, gestural interactions, virtual reality operating system, or flowcharts.

The method further includes deselecting a selected virtual note responsive to an outward scoop hand gesture.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In another implementation, a method of selecting a virtual note from a collection of virtual notes arranged in a grid is described. The method includes generating a virtual grid with a plurality of virtual notes responsive to gestures in a three-dimensional (3D) sensory space, defining a horizontal extent of navigation along a first axis of the virtual grid in proportion to length of a horizontal sweep of a hand in the 3D sensory space, defining a vertical extent of navigation along a second axis of the virtual grid in proportion to length of a vertical sweep of the hand in the 3D sensory space, wherein the second axis is perpendicular to the first axis, and automatically selecting a virtual item in the virtual grid at a terminal end of the vertical sweep responsive to a transition of physical arrangement of the hand from clenched first to open hand.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as gesture recognition system, computer system, augmented reality, gestural interactions, virtual reality operating system, or flowcharts.

In one implementation, the horizontal sweep is a right gesture. In another implementation, the horizontal sweep is a left gesture. In a further implementation, the vertical sweep is an upward gesture. In yet another implementation, the vertical sweep is a downward gesture.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In yet another implementation, a method of selecting a virtual note from a collection of virtual notes arranged in a grid is described. The method includes generating a virtual grid with a plurality of virtual notes responsive to gestures in a three-dimensional (3D) sensory space, automatically selecting a particular virtual note from the virtual grid responsive to a pinching hand gesture in the 3D sensory space, including identifying the particular virtual note for selection responsive to flat-hand hovering of a hand above the particular virtual note in the virtual grid and selecting the particular virtual note responsive to a transition of physical arrangement of the hand from flat-hand hovering above the particular virtual note to pinching of its thumb and one or more fingers towards the particular virtual.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as gesture recognition system, computer system, augmented reality, gestural interactions, virtual reality operating system, or flowcharts.

The method further includes deselecting a selected virtual note responsive to an expanding hand gesture.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In one implementation, a method of selecting a virtual note from a collection of virtual notes arranged in a grid is described. The method includes generating a virtual grid with a plurality of virtual notes responsive to gestures in a three-dimensional (3D) sensory space, automatically selecting a particular virtual note from the virtual grid responsive to an open-hand gesture in the 3D sensory space, including identifying the particular virtual note for selection responsive to a one-finger point gesture of a hand towards the particular virtual note in the virtual grid and selecting the particular virtual note responsive to a transition of physical arrangement of the hand from one-finger pointing towards the particular virtual note to immediate opening of the hand above the particular virtual note.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as gesture recognition system, computer system, augmented reality, gestural interactions, virtual reality operating system, or flowcharts.

The method further includes deselecting a selected virtual note responsive to clenching of the hand.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In another implementation, a method of selecting a virtual note from a collection of virtual notes arranged in a grid is described. The method includes generating a virtual grid with a plurality of virtual notes responsive to gestures in a three-dimensional (3D) sensory space, automatically selecting a particular virtual note from the virtual grid responsive to a first clenching hand gesture in the 3D sensory space, including identifying the particular virtual note for selection responsive to flat-hand hovering of a hand above the particular virtual note in the virtual grid and selecting the particular virtual note responsive to a transition of physical arrangement of the hand from flat-hand hovering above the particular virtual note to curling of its thumb and fingers above the particular virtual.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as gesture recognition system, computer system, augmented reality, gestural interactions, virtual reality operating system, or flowcharts.

The method further includes deselecting a selected virtual note responsive to an expanding of thumb and fingers of the hand.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In yet another implementation, a method of selecting a virtual note from a collection of virtual notes arranged in a grid is described. The method includes generating a virtual grid with a plurality of virtual notes responsive to gestures in a three-dimensional (3D) sensory space, automatically selecting a particular virtual note from the virtual grid responsive to a spread-and-bunch-again gesture in the 3D sensory space, including identifying the particular virtual note for selection responsive to bunched-fingers hovering of a hand above the particular virtual note in the virtual grid and selecting the particular virtual note responsive to a transition of physical arrangement of the hand from bunched-fingers hovering above the particular virtual note to spreading apart of the fingers above the particular virtual note and to immediate bunching of the fingers.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as gesture recognition system, computer system, augmented reality, gestural interactions, virtual reality operating system, or flowcharts.

The method further includes deselecting a selected virtual note responsive to a spreading apart of the fingers above the particular virtual note without a subsequent immediate bunching of the fingers.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In one implementation, a method of selecting a virtual note from a collection of virtual notes arranged in a grid is described. The method includes generating a virtual grid with a plurality of virtual notes responsive to gestures in a three-dimensional (3D) sensory space, automatically selecting a particular virtual note from the virtual grid responsive to an okay hand gesture in the 3D sensory space, including identifying the particular virtual note for selection responsive to flat-hand hovering of a hand above the particular virtual note in the virtual grid and selecting the particular virtual note responsive to a transition of physical arrangement of the hand from flat-hand hovering above the particular virtual note to curling of its thumb and index-finger above the particular virtual and vertical expansion of other fingers.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as gesture recognition system, computer system, augmented reality, gestural interactions, virtual reality operating system, or flowcharts.

The method further includes deselecting a selected virtual note responsive to paralleling of the thumb and the fingers.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In one implementation, a method of selecting a virtual note from a collection of virtual notes arranged in a grid is described. The method includes generating a virtual grid with a plurality of virtual notes responsive to gestures in a three-dimensional (3D) sensory space, generating for display a proximity indicator that provides visual feedback regarding proximity of a hand to a particular virtual note and escalation from proximity to contact of the hand with the particular virtual note, and automatically selecting the particular virtual note from the virtual grid when the hand approaches the virtual note within an initial hover proximity threshold.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as gesture recognition system, computer system, augmented reality, gestural interactions, virtual reality operating system, or flowcharts.

In one implementation, the generated display further includes modifying size of the proximity indicator responsive to distance between the hand and the particular virtual note.

In another implementation, the generated display further includes modifying appearance of the proximity indicator responsive to distance between the hand and the particular virtual note.

In yet another implementation, the generated display further includes modifying shape of the proximity indicator responsive to distance between the hand and the particular virtual note.

In a further implementation, the generated display further includes modifying opacity of the proximity indicator responsive to distance between the hand and the particular virtual note.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In yet another implementation, a method of selecting a virtual note from a collection of virtual notes arranged in a grid is described. The method includes generating a virtual grid with a plurality of virtual notes responsive to gestures in a three-dimensional (3D) sensory space, automatically selecting a particular virtual note from the virtual grid responsive to a finger gun gesture in the 3D sensory space, including identifying the particular virtual note for selection responsive to a one-finger point of the finger gun towards the particular virtual note in the virtual grid and selecting the particular virtual note responsive to a transition of physical arrangement of the finger gun from one-finger pointing towards the particular virtual note to inward curling of a finger used to perform the one-finger pointing.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as gesture recognition system, computer system, augmented reality, gestural interactions, virtual reality operating system, or flowcharts.

In one implementation, the one-finger pointing is performed using an index finger. In another implementation, the method further include selecting the particular virtual note responsive to a transition of physical arrangement of the finger gun from one-finger pointing towards the particular virtual note to inward curling of a thumb of the finger gun. In yet another implementation, the method further includes deselecting a selected virtual note responsive to outward curling of the finger used to perform the one-finger pointing.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In another implementation, a method of selecting a virtual note from a collection of virtual notes arranged in a grid is described. The method includes generating a virtual grid with a plurality of virtual notes responsive to gestures in a three-dimensional (3D) sensory space, automatically selecting a particular virtual note from the virtual grid responsive to a rotation of a hand in the 3D sensory space, including identifying the particular virtual note for selection responsive to a prone flat-hand hovering of a hand above the particular virtual note in the virtual grid and selecting the particular virtual note responsive to a transition of physical arrangement of the hand from pronation to supination when the hand turns from a prone position to a supine position while hovering over the particular virtual note.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as gesture recognition system, computer system, augmented reality, gestural interactions, virtual reality operating system, or flowcharts.

The method further includes deselecting a selected virtual note responsive to supination of the prone flat-hand hovering over the particular virtual note.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method including:
creating a real-time digital representation of a real-world physical environment in which a user of a head mounted device is positioned, the environment further comprising a 3D sensory space with a defined volume of interest;
generating, for continuous display by the head mounted device, a live video stream including the real-time digital representation of the real-world physical environment;
providing the user of the head mounted device with the generated live video stream;
identifying, by the head mounted device, a unique real-world marker that is present in the real-world physical environment from (i) the live video stream or (ii) the real-world physical environment;
identifying, by the head mounted device, a virtual interactive item, from a library of virtual interactive items, that corresponds to and provides information about the identified unique real-world marker;
generating, for display, 3D virtual imagery including (i) a virtual grid with a plurality of grid lines, (ii) virtual imagery corresponding to the identified virtual interactive item, and (iii) virtual imagery corresponding to a plurality of virtual items responsive to gestures in the 3D sensory space, wherein each generated virtual item is in visual correspondence with a different set of gridlines and wherein the generated 3D virtual imagery is superimposed, as a free-floating virtual modality in the real-world physical environment allowing the user to simultaneously view both the 3D virtual imagery and the real-world physical environment;
providing the user of the head mounted device with the generated 3D virtual imagery;
detecting, using images provided in the generated live video stream, a gesture in the defined volume of interest of the 3D sensory space by the user of the head mounted device;
interpreting the detected gesture as selecting one virtual item from the library of virtual interactive items;
generating, for display by the head mounted device, a menu associated with the selected virtual item;
providing the user of the head mounted device with the generated menu; and
modifying a presentation property of the selected virtual item in the virtual grid by augmenting the selected and displayed virtual item with additional graphics.

2. The method of claim 1, further including superimposing, by the head mounted device, the identified virtual interactive item onto the identified unique real-world marker.

3. The method of claim 1, wherein
the head mounted device includes one or more projectors that project imagery into the real-world physical environment and wherein the method further includes projecting, by the one or more projectors of the head mounted device, the identified virtual interactive item onto the identified unique real-world marker in the real-world physical environment, such that other individuals in the real-world physical environment can view the virtual interactive item that is projected into the real-world environment.

4. The method of claim 1, wherein:
the identifying of the virtual interactive item identifies two or more virtual interactive items, from the library of virtual interactive items, that correspond to and provide information about the identified unique real-world marker; and
the identified two or more virtual interactive items are included in the 3D virtual imagery generated for display.

5. The method of claim 1, wherein
the detected gesture is a scooping gesture in which a representation of a hand of a user appears to start from a position behind a virtual item and then proceed in a motion that appears to scoop up the virtual item from behind.

6. The method of claim 1, wherein
the identified virtual interactive item is superimposed in place of the identified unique real-world marker, so as to replace the identified unique real-world marker from view of the user.

7. The method of claim 1 wherein
the unique real-world marker comprises at least one of a two- or three-dimensional barcode.

8. The method of claim 1 wherein
the unique real-world marker comprises an image of a real-world item.

9. A method including:
creating a real-time digital representation of a real-world physical environment in which a user of a head mounted device is positioned, the environment further comprising a 3D sensory space with a defined volume of interest;
generating, for continuous display by the head mounted device, a live video stream including the real-time digital representation of the real-world physical environment;
providing the user of the head mounted device with the generated live video stream;
identifying, by the head mounted device, a unique real-world marker that is present in the real-world physical environment from (i) the live video stream or (ii) the real-world physical environment;
identifying, by the head mounted device, a virtual interactive item, from a library of virtual interactive items, that corresponds to and provides information about the identified unique real-world marker;

generating, for display, 3D virtual imagery including (i) a virtual grid with a plurality of grid lines, (ii) virtual imagery corresponding to the identified virtual interactive item, and (iii) virtual imagery corresponding to a plurality of virtual items responsive to gestures in the 3D sensory space, wherein each generated virtual item is in visual correspondence with a different set of gridlines and wherein the generated 3D virtual imagery is superimposed, as a free-floating virtual modality in the real-world physical environment allowing the user to simultaneously view both the 3D virtual imagery and the real-world physical environment;

providing the user of the head mounted device with the generated 3D virtual imagery;

detecting, using images provided in the generated live video stream, a first sweep of a control object responsive to a first control gesture in the defined volume of interest of the 3D sensory space by the user of the head mounted device;

defining an extent of translation along a first axis of a virtual grid in proportion to length of the detected first sweep of the control object;

detecting, using images provided in the generated live video stream, a second sweep of the control object responsive to a second control gesture in the defined volume of interest of the 3D sensory space by the user of the head mounted device;

defining an extent of translation along a second axis of the virtual grid in proportion to length of the detected second sweep of the control object, wherein the second axis is perpendicular to the first axis;

automatically selecting a virtual item of the generated virtual items in the virtual grid at a terminal end of the detected second sweep; and modifying a presentation property of the selected virtual item in the virtual grid by augmenting the selected and displayed virtual item with additional graphics.

10. A method including:

creating a real-time digital representation of a real-world physical environment in which a user of a head mounted device is positioned, the environment further comprising a 3D sensory space with a defined volume of interest;

generating, for continuous display by the head mounted device, a live video stream including the real-time digital representation of the real-world physical environment;

providing the user of the head mounted device with the generated live video stream;

identifying, by the head mounted device, a unique real-world marker that is present in the real-world physical environment from (i) the live video stream or (ii) the real-world physical environment;

identifying, by the head mounted device, a virtual interactive item, from a library of virtual interactive items, that corresponds to and provides information about the identified unique real-world marker;

generating, for display, 3D virtual imagery including (i) a virtual grid with a plurality of grid lines, (ii) virtual imagery corresponding to the identified virtual interactive item and (iii) virtual imagery corresponding to a plurality of virtual items responsive to gestures in the 3D sensory space, wherein each generated virtual item is in visual correspondence with a different set of gridlines and wherein the generated 3D virtual imagery is superimposed, as a free-floating virtual modality in the real-world physical environment allowing the user to simultaneously view both the 3D virtual imagery and the real-world physical environment;

providing the user of the head mounted device with the generated 3D virtual imagery;

detecting, using images provided in the generated live video stream, a horizontal sweep of a control object responsive to a first control gesture in the defined volume of interest of the 3D sensory space by the user of the head mounted device;

defining a horizontal extent of translation along a first axis of a virtual grid in proportion to length of the detected horizontal sweep of the control object;

detecting, using images provided in the generated live video stream, a vertical sweep of the control object responsive to a second control gesture in the defined volume of interest of the 3D sensory space by the user of the head mounted device;

defining a vertical extent of translation along a second axis of the virtual grid in proportion to length of the detected vertical sweep of the control object, wherein the second axis is perpendicular to the first axis;

automatically selecting virtual item of the generated virtual items in the virtual grid at a terminal end of detected the vertical sweep; and modifying a presentation property of the selected virtual item in the virtual grid by augmenting the selected and displayed virtual item with additional graphics.

* * * * *